(12) United States Patent
Vitullo

(10) Patent No.: US 10,372,146 B2
(45) Date of Patent: Aug. 6, 2019

(54) SYSTEMS AND METHODS FOR CREATING AND USING COMBINED PREDICTIVE MODELS TO CONTROL HVAC EQUIPMENT

(71) Applicant: Johnson Controls Technology Company, Plymouth, MI (US)

(72) Inventor: Steven R. Vitullo, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 127 days.

(21) Appl. No.: 15/331,755

(22) Filed: Oct. 21, 2016

(65) Prior Publication Data

US 2018/0113482 A1 Apr. 26, 2018

(51) Int. Cl.
| | |
|---|---|
| *G06N 7/00* | (2006.01) |
| *F24F 11/61* | (2018.01) |
| *F24F 11/62* | (2018.01) |
| *F24F 11/63* | (2018.01) |
| *G05D 23/19* | (2006.01) |
| *H04L 12/28* | (2006.01) |
| *F24F 110/10* | (2018.01) |

(Continued)

(52) U.S. Cl.
CPC .......... *G05D 23/1917* (2013.01); *F24F 11/61* (2018.01); *F24F 11/62* (2018.01); *F24F 11/63* (2018.01); *G06N 7/005* (2013.01); *H04L 12/2823* (2013.01); *F24F 2110/10* (2018.01); *F24F 2140/50* (2018.01); *F24F 2140/60* (2018.01)

(58) Field of Classification Search
CPC . G05D 23/1917; G06N 7/005; H04L 12/2816

USPC .................................................. 700/276–298
See application file for complete search history.

(56) References Cited

U.S. PATENT DOCUMENTS

| 9,235,657 B1 | 1/2016 | Wenzel et al. | |
|---|---|---|---|
| 2004/0088069 A1* | 5/2004 | Singh | G06Q 50/06 700/108 |

(Continued)

OTHER PUBLICATIONS

Batchelor et al., Forecaster Diversity and the Benefits of Combining Forecasts, Management Science, vol. 41, No. 1, Jan. 1995, 8 pages.

(Continued)

*Primary Examiner* — Ziaul Karim
(74) *Attorney, Agent, or Firm* — Foley & Lardner LLP

(57) ABSTRACT

A heating, ventilation, or air conditioning (HVAC) system for a building includes HVAC equipment, a controller, and a predictive modeling system. The HVAC equipment are operable to affect an environmental condition in the building. The controller is configured to determine an operating point for the HVAC equipment and to operate the HVAC equipment at the operating point. The predictive modeling system includes a plurality of HVAC component models and one or more prediction combiners. The HVAC component models are configured to generate a plurality of component model predictions based on the operating point. The prediction combiners are configured to combine the plurality of component model predictions to form a combined model prediction. The controller is configured to use the combined model prediction to optimize the operating point and to operate the HVAC equipment at the optimized operating point.

8 Claims, 9 Drawing Sheets

(51) Int. Cl.
  *F24F 140/50* (2018.01)
  *F24F 140/60* (2018.01)

(56) References Cited

U.S. PATENT DOCUMENTS

| | | | | |
|---|---|---|---|---|
| 2008/0179053 | A1* | 7/2008 | Kates | F24F 3/044 |
| | | | | 165/208 |
| 2011/0257911 | A1* | 10/2011 | Drees | G05B 15/02 |
| | | | | 702/61 |
| 2014/0018940 | A1* | 1/2014 | Casilli | G05B 15/02 |
| | | | | 700/29 |
| 2014/0107850 | A1* | 4/2014 | Curtis | H02J 3/00 |
| | | | | 700/291 |
| 2015/0316902 | A1 | 11/2015 | Wenzel et al. | |
| 2015/0316903 | A1 | 11/2015 | Asmus et al. | |
| 2015/0316907 | A1 | 11/2015 | Elbsat et al. | |

OTHER PUBLICATIONS

Bopp, A., On Combining Forecasts: Some Extensions and Results, Management Science, vol. 21, No. 12, Dec. 1985, 7 pages.

Dickinson, J.P., Some Comments on the Combination of Forecasts, Operational Research Quarterly, vol. 26, No. 1, Part 2, Apr. 1975, 6 pages.

Gordon et al., Chapter 10: Quasi-Empirical Thermodynamic Model for Chillers in Cool Thermodynamics: The Engineering and Physics of Predictive, Diagnostic and Optimization Methods for Cooling Systems, 2001, Cambridge International Science Publishing, Cambridge, UK, 33 pages.

Gordon et al., Chapter 5: The Fundamental Chiller Model in Terms of Readily-Measurable Variables in Cool Thermodynamics: The Engineering and Physics of Predictive, Diagnostic and Optimization Methods for Cooling Systems, first published Jul. 2000, Cambridge International Science Publishing, Cambridge, UK, 13 pages.

Granger et al., Improved Methods of Combining Forecasts, Journal of Forecasting, vol. 3, No. 2, Apr. 1984, 8 pages.

Jiang et al., Reevaluation of the Gordon-Ng Performance Models for Water-Cooled Chillers, ASHRAE Transactions, vol. 109, 2003, 16 pages.

Lee et al, Evaluation of the Suitability of Empirically-Based Models for Predicting Energy Performance of Centrifugal Water Chillers with Variable Chilled Water Flow, Applied Energy, vol. 93, May 2012, 13 pages.

Lee et al., An Evaluation of Empirically-Based Models for Predicting Energy Performance of Vapor-Compression Water Chillers, Applied Energy, vol. 87, No. 11, Nov. 2010, 8 pages.

Smith, D.G.C, Combination of Forecasts in Electricity Demand Predication, Journal of Forecasting, vol. 8, No. 3, Jul. 1989, 8 pages.

U.S. Appl. No. 14/971,813, filed Dec. 16, 2015, Johnson Controls Technology Company.

U.S. Appl. No. 15/179,894, filed Jun. 10, 2016, Johnson Controls Technology Company.

U.S. Appl. No. 15/182,580, filed Jun. 14, 2016, Johnson Controls Technology Company.

Armstrong et al., Error Measures for Generalizing About Forecasting Methods: Empirical Comparisons, International Journal of Forecasting, vol. 8, No. 1, Jun. 1992, 18 pages.

Armstrong et al., On the Selection of Error Measures for Comparisons Among Forecasting Methods, Journal of Forecasting, vol. 14, No. 1, Jan. 1995, 5 pages.

Armstrong, J., Combining Forecasts, in Principles of Forecasting: a Handbook for Researchers and Practitioners, 2001, Kluwer Academic Publishers, Boston, MA, 19 pages.

Armstrong, J., Combining Forecasts: The End of the Beginning or the Beginning of the End?, International Journal of Forecasting, vol. 5, No. 4, Feb. 1989, 5 pages.

Bates et al., The Combination of Forecasts, Operational Research Quarterly, vol. 20, No. 4, Dec. 1969, 18 pages.

Clemen, R., Combining Forecasts: A Review and Annotated Bibliography, International Journal of Forecasting, vol. 5, No. 4, Jan. 1989, 25 pages.

Timmerman, A., Forecast Combinations, UCSD, Nov. 1, 2004, 84 pages.

Vitullo et al., Mathematical Models for Natural Gas Forecasting, Canadian Applied Mathematics Quarterly, vol. 17, No. 4, Winter 2009, 22 pages.

Vitullo, S. "Disaggregating Time Series Data for Energy Consumption by Aggregate and Individual Customer," Dissertations (2009-), Paper 169, Marquette University, Dec. 2011, 151 pages.

Winkler et al., The Combination of Forecasts, Journal of the Royal Statistical Society Series A, vol. 146, No. 2, 1983, 8 pages.

* cited by examiner

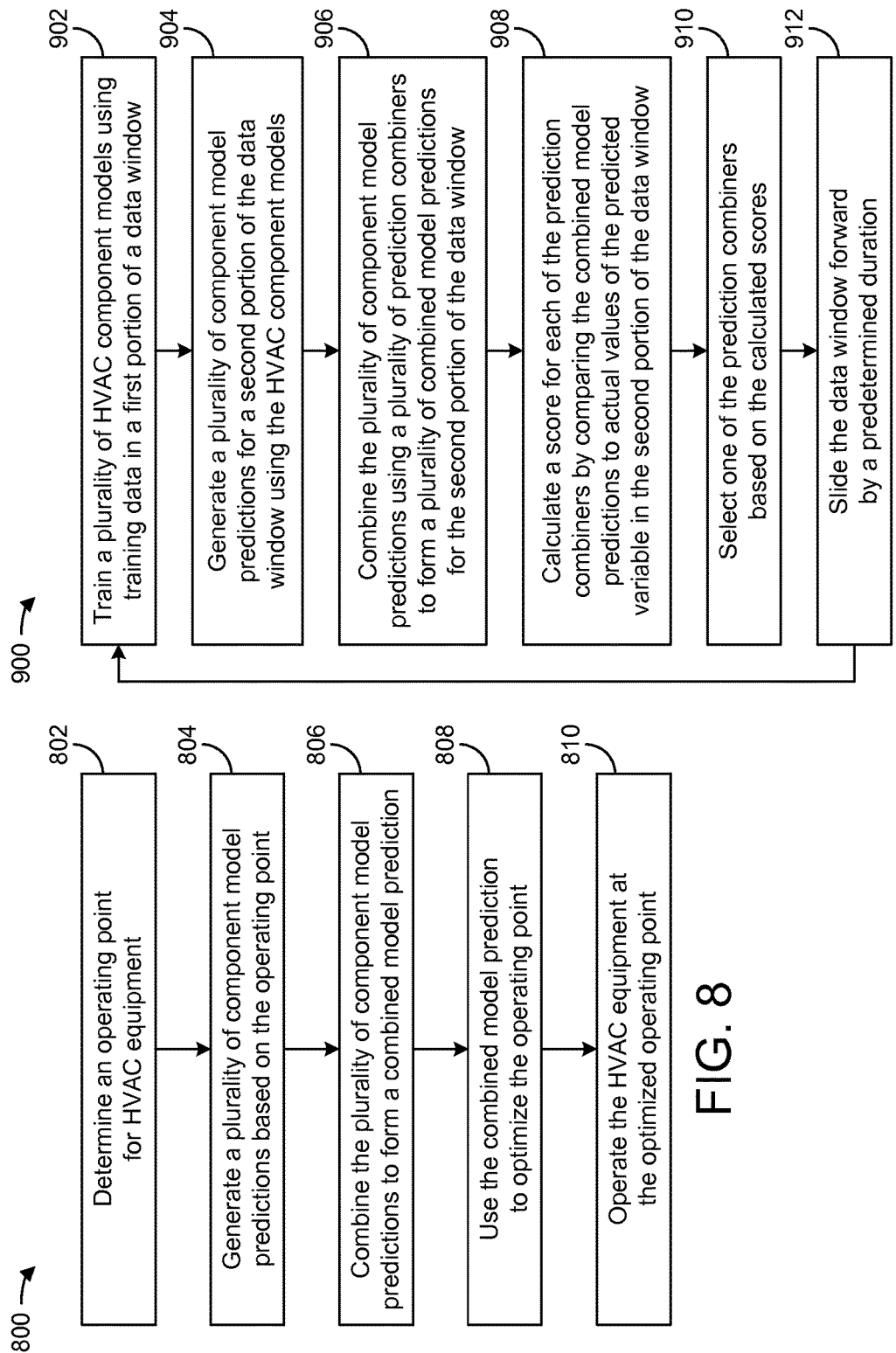

SYSTEMS AND METHODS FOR CREATING AND USING COMBINED PREDICTIVE MODELS TO CONTROL HVAC EQUIPMENT

BACKGROUND

The present disclosure relates generally to predictive modeling systems for HVAC equipment and more particularly to a predictive modeling system which combines the output of multiple predictive models to form a combined model prediction.

Modern energy conservation measures (ECM) include optimizing the dispatch of a central energy facility to use equipment at optimal times of the day when efficiencies are higher, combined with adding thermal energy storage to reduce the peak energy demand during the day. In order to verify the effectiveness of an ECM, a baseline model is typically created to find the initial cost of running the central energy facility. This cost is then compared to the cost of an optimized plant with new equipment added, and the capital savings is the difference between these numbers. Performance contracts rely on the ability to accurately create the baseline model, as well as the projected savings.

Equipment models can be used to optimize the performance of the central energy facility. This optimization be performed in two ways: (1) as a planning tool to run what if scenarios for capacity planning to see what would happen under different conditions and (2) as a real time operational tool to optimize the current running conditions. Both of these scenarios can use HVAC equipment models to predict power consumption and maintain flow, temperature, power, and pressure load balances.

Existing predictive modeling systems use a single model to predict the performance of HVAC equipment under various scenarios. Efforts to improve model prediction accuracy in the HVAC domain have focused on trying to find a best fitting and generalizable model that works on a wide variety of HVAC equipment of a particular type (e.g., a generalizable chiller model). Although generalizable models perform adequately under most operating conditions, no predictive model is perfect, no matter how complex. Accordingly, even the best predictive models can lack accuracy under some operating conditions. It would be desirable to predict HVAC equipment performance in a manner that overcomes the disadvantages associated with existing predictive modeling systems.

SUMMARY

One implementation of the present disclosure is a heating, ventilation, or air conditioning (HVAC) system for a building. The HVAC system includes HVAC equipment, a controller, and a predictive modeling system. The HVAC equipment are operable to affect an environmental condition in the building. The controller is configured to determine an operating point for the HVAC equipment and to operate the HVAC equipment at the operating point. The predictive modeling system includes a plurality of HVAC component models and one or more prediction combiners. The HVAC component models are configured to generate a plurality of component model predictions based on the operating point. Each of the component model predictions is generated by one of the HVAC component models and includes a predicted value of a performance variable indicating a predicted performance of the HVAC equipment at the operating point. The prediction combiners are configured to combine the plurality of component model predictions to form a combined model prediction. The combined model prediction includes another predicted value of the performance variable. The controller is configured to use the combined model prediction to optimize the operating point and to operate the HVAC equipment at the optimized operating point.

In some embodiments, the operating point is a setpoint for the HVAC equipment and the performance variable indicates a predicted power consumption of the HVAC equipment at the setpoint.

In some embodiments, the HVAC system includes one or more sensors configured to measure one or more measured variables associated with the HVAC equipment. The HVAC component models can be configured to generate the component model predictions as a function of the measured variables.

In some embodiments, each of the HVAC component models has a different functional form and uses a different mathematical relationship to generate the corresponding component model prediction.

In some embodiments, the prediction combiners include an equal weighting combiner configured to generate the combined model prediction by calculating an average of the component model predictions.

In some embodiments, the prediction combiners include a variance weighting combiner configured to identify a variance associated with each of the component model predictions, assign a weight to each of the component model predictions based on the variance associated therewith, and generate the combined model prediction by calculating a weighted average of the component model predictions using the assigned weights.

In some embodiments, the prediction combiners comprise a trimmed mean combiner configured to create an initial set of the component model predictions, identify one or more highest values of the component model predictions and one or more lowest values of the component model predictions create a filtered subset of the component model predictions by removing the identified component model predictions from the initial set, and generate the combined model prediction by calculating an average of the component model predictions in the filtered subset.

In some embodiments, the trimmed mean combiner is configured to use a variance weighting technique to calculate the average of the component model predictions in the filtered subset. The variance weighting technique can include identifying a variance associated with each of the component model predictions in the filtered subset, assigning a weight to each of the component model predictions based on the variance associated therewith, and generating the combined model prediction by calculating a weighted average of the component model predictions in the filtered subset using the assigned weights.

In some embodiments, the HVAC system includes a model evaluator configured to calculate a score for each of the prediction combiners by comparing the combined model predictions generated by each of the prediction combiners to actual values of the performance variable. The HVAC system can further include a combiner selector configured use the calculated scores to select one of the prediction combiners. In some embodiments, the predictive modeling system is configured to use the selected prediction combiner to generate the combined model prediction.

Another implementation of the present disclosure is a method for controlling HVAC equipment. The method includes determining an operating point for the HVAC equipment and generating a plurality of component model predictions based on the operating point. Each of the component model predictions includes a predicted value of a performance variable indicating a predicted performance of the HVAC equipment at the operating point. The method further includes combining the plurality of component model predictions to form a combined model prediction. The combined model prediction includes another predicted value of the performance variable. The method further includes using the combined model prediction to optimize the operating point and operating the HVAC equipment at the optimized operating point. Operating the HVAC equipment affects an environmental condition in a building.

In some embodiments, the operating point is a setpoint for the HVAC equipment and the performance variable indicates a predicted power consumption of the HVAC equipment at the setpoint.

In some embodiments, the method includes measuring one or more measured variables associated with the HVAC equipment using one or more sensors. The component model predictions can be generated as a function of the measured variables.

In some embodiments, each of the component model predictions is generated using a different HVAC component model. In some embodiments, each of the HVAC component models has a different functional form and uses a different mathematical relationship to generate the corresponding component model prediction.

In some embodiments, combining the plurality of component model predictions to form the combined model prediction includes calculating an average of the component model predictions.

In some embodiments, combining the plurality of component model predictions to form the combined model prediction includes identifying a variance associated with each of the component model predictions, assigning a weight to each of the component model predictions based on the variance associated therewith, and generating the combined model prediction by calculating a weighted average of the component model predictions using the assigned weights.

In some embodiments, combining the plurality of component model predictions to form the combined model prediction includes creating an initial set of the component model predictions, identifying one or more highest values of the component model predictions and one or more lowest values of the component model predictions, creating a filtered subset of the component model predictions by removing the identified component model predictions from the initial set, and generating the combined model prediction by calculating an average of the component model predictions in the filtered subset.

In some embodiments, a variance weighting technique is used to calculate the average of the component model predictions in the filtered subset. The variance weighting technique can include identifying a variance associated with each of the component model predictions in the filtered subset, assigning a weight to each of the component model predictions based on the variance associated therewith, and generating the combined model prediction by calculating a weighted average of the component model predictions in the filtered subset using the assigned weights.

In some embodiments, the method includes calculating a score for each of the prediction combiners by comparing the combined model predictions to actual values of the performance variable, selecting one of the prediction combiners based on the calculated scores, and generating the combined model prediction using the selected prediction combiner.

Another implementation of the present disclosure is a system for controlling HVAC equipment. The system includes a plurality of HVAC component models configured to generate a plurality of component model predictions based on an operating point for HVAC equipment. Each of the component model predictions is generated by one of the HVAC component models and includes a predicted value of a performance variable indicating a predicted performance of the HVAC equipment at the operating point. The system further includes one or more prediction combiners configured to combine the plurality of component model predictions to form a combined model prediction. The combined model prediction includes another predicted value of the performance variable. The system further includes a controller configured to use the combined model prediction to optimize the operating point and to operate the HVAC equipment at the optimized operating point. Operating the HVAC equipment affects an environmental condition in a building.

In some embodiments, the operating point is a setpoint for the HVAC equipment and the performance variable indicates a predicted power consumption of the HVAC equipment at the setpoint.

Another implementation of the present disclosure is another a heating, ventilation, or air conditioning (HVAC) system for a building. The HVAC system includes HVAC equipment operable to affect a temperature of the building, a plurality of zone temperature models, one or more prediction combiners, and a temperature controller. The zone temperature models are configured to generate a plurality of zone temperature predictions. Each of the zone temperature predictions is generated by one of the zone temperature models and includes a predicted value of the temperature of the building. The prediction combiners are configured to combine the plurality of zone temperature predictions to form a combined model prediction. The combined model prediction includes another predicted value of the temperature of the building. The temperature controller is configured to use the combined model prediction to generate control signals for the HVAC equipment and to operate the HVAC equipment according to the control signals.

In some embodiments, the system includes one or more sensors configured to measure the temperature of the building. The zone temperature models can be configured to generate the zone temperature predictions as a function of the measured temperature of the building and the control signals for the HVAC equipment.

Another implementation of the present disclosure is a heating, ventilation, or air conditioning (HVAC) system for a building. The HVAC system includes HVAC equipment operable to affect a temperature of the building, a plurality of models, one or more estimate combiners, and a controller. The plurality of models are configured to estimate a plurality of values for a variable of interest in the HVAC system. Each of the plurality of values is estimated by one of the plurality of models. The estimate combiners are configured to combine the plurality of estimated values to form a combined model estimate. The combined model estimate includes another value of the variable of interest. The controller is configured to use the combined model estimate to generate control signals for the HVAC equipment and to operate the HVAC equipment according to the control signals.

In some embodiments, the system includes one or more sensors configured to measure one or more predictor variables. The plurality of models can be configured to estimate the variable of interest as a function of the measured predictor variables.

In some embodiments, the variable of interest is a building energy load. Each of the plurality of models can be configured to estimate a value for the building energy load at each of a plurality of times within a time period. The predictor variables can include one or more variables that affect the building energy load during the time period.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 8 is flowchart of a process for controlling HVAC equipment which can be performed by the predictive modeling system of FIG. 4, according to an exemplary embodiment.

FIG. 9 is a flowchart of a process for evaluating model performance which can be performed by the predictive modeling system of FIG. 4, according to an exemplary embodiment.

DETAILED DESCRIPTION

Overview

Figure 1:
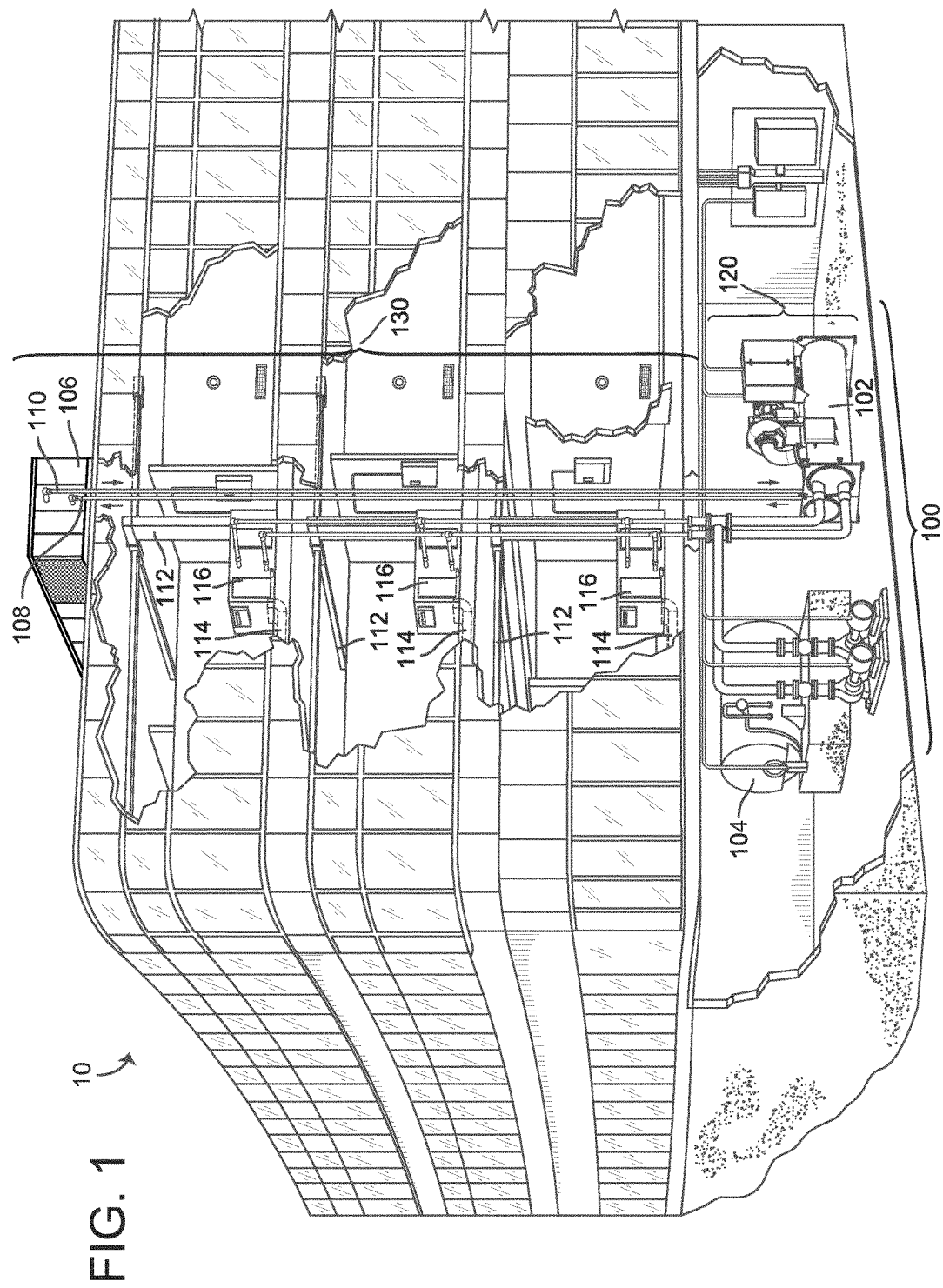
FIG. 1 is a drawing of a building equipped with a HVAC system, according to an exemplary embodiment.

Referring generally to the FIGURES, systems and methods for creating and using combined predictive models to control HVAC equipment are shown, according to various exemplary embodiments. Predictive models for HVAC equipment can include any of a variety of models that characterize the performance of the HVAC equipment. Throughout this disclosure, the terms "predictive model" and "equipment model" are used interchangeably. Equipment models can include power consumption models that can be used to predict the power consumption of individual HVAC devices at various operating points. In some embodiments, equipment models can be used to predict various output variables (e.g., coefficient of performance, power consumption, etc.) of HVAC equipment as a function of the monitored variables and/or operating points.

In some embodiments, the equipment models define power consumption as a function of equipment load and/or equipment setpoints. For example, an equipment model for a chiller may define the power consumption of the chiller as a function of cold water production and/or chiller load setpoints. In general, an equipment model for a particular HVAC device may define the relationship between the inputs to the HVAC device and the outputs of the HVAC device. Equipment models can be used to predict an amount of input resources (e.g., electricity, water, natural gas, etc.) required to produce a desired amount of an output resource (e.g., chilled water, hot water, electricity, etc.). Equipment models can be used to predict the power consumption of various devices of HVAC equipment that will result from the on/off decisions and setpoints for the HVAC equipment.

Equipment models can be used to optimize the operation of HVAC equipment. For example, a central plant controller can use equipment models in a real-time operational tool to optimize the current running conditions of a physical plant. Equipment models can also be used by a planning tool to operate a simulated plant under various hypothetical scenarios to evaluate system performance under different sets of conditions. The simulated plant can be adjusted to reflect planned equipment purchases, installation of energy-efficient equipment, or other planned changes to allow the central plant optimizer to run various hypothetical scenarios before the changes are actually made to the physical plant.

A predictive modeling system can use multiple equipment models for the same predicted variable to generate multiple component model predictions. The predictive modeling system can then combine the component model predictions for a given predicted variable to form a combined model prediction. The predictive modeling system can use any of a variety of techniques to combine the component model predictions. For example, the predictive modeling system can use equal weighting, principal components, trimmed means, constrained or unconstrained regression, artificial neural networks, variance weighting, ensemble machine learning techniques (e.g., boosting, bagging, etc.), or any other combination technique to generate a combined model prediction from multiple component model predictions.

Combining multiple component model predictions to form a combined model prediction has several advantages. For example, different component models may use different input variables to predict the same output variable. This results in diversity of model inputs when the component model predictions are combined, which can increase the accuracy of the combined model prediction. Additionally, a diversity of component model types can improve the accuracy of the combined model prediction in circumstances when specific types of component models may lack accuracy. For example, some component model types may be more accurate than others at predicting chiller power consumption under high load conditions, but less accurate than the others at predicting chiller power consumption under low load conditions.

The existence of multiple different component model types increases the probability that not all of the component models will lack accuracy under the same set of conditions. Furthermore, using multiple different component models to predict the same variable allows for outlier predictions to be identified and removed from the set of predictions before combination. This can also increase the accuracy of the combined model prediction by pruning outlier predictions. Additional features and advantages of the predictive modeling system are described in greater detail below.

Building HVAC System

Referring now to FIG. 1, a perspective view of a building 10 is shown. Building 10 is served by a building automation system (BAS). A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant and Control System

Figure 2:
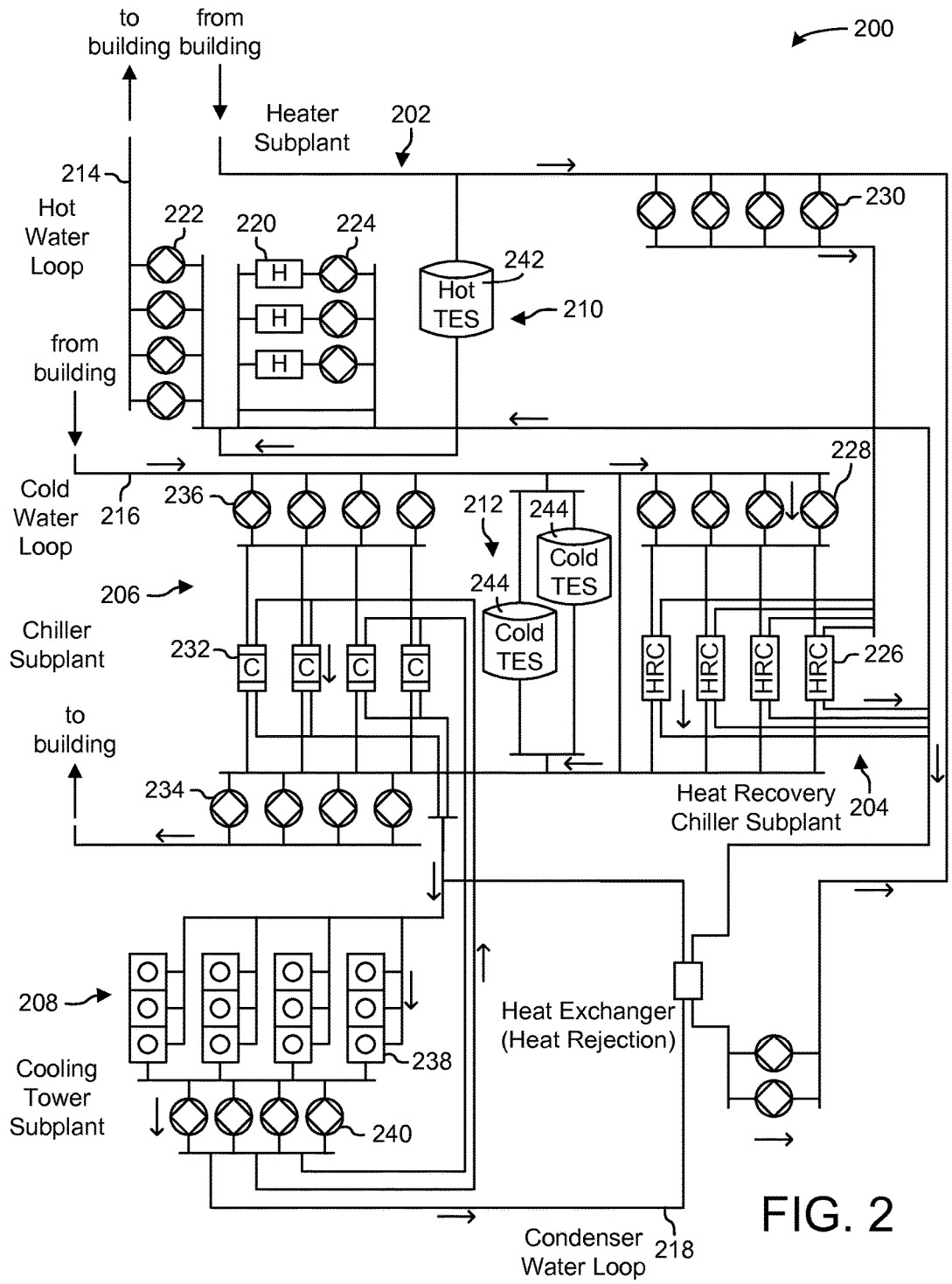
FIG. 2 is a schematic of a central plant that includes a plurality of subplants which may be used to provide heating and/or cooling to the building of FIG. 1, according to an exemplary embodiment.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Figure 3:
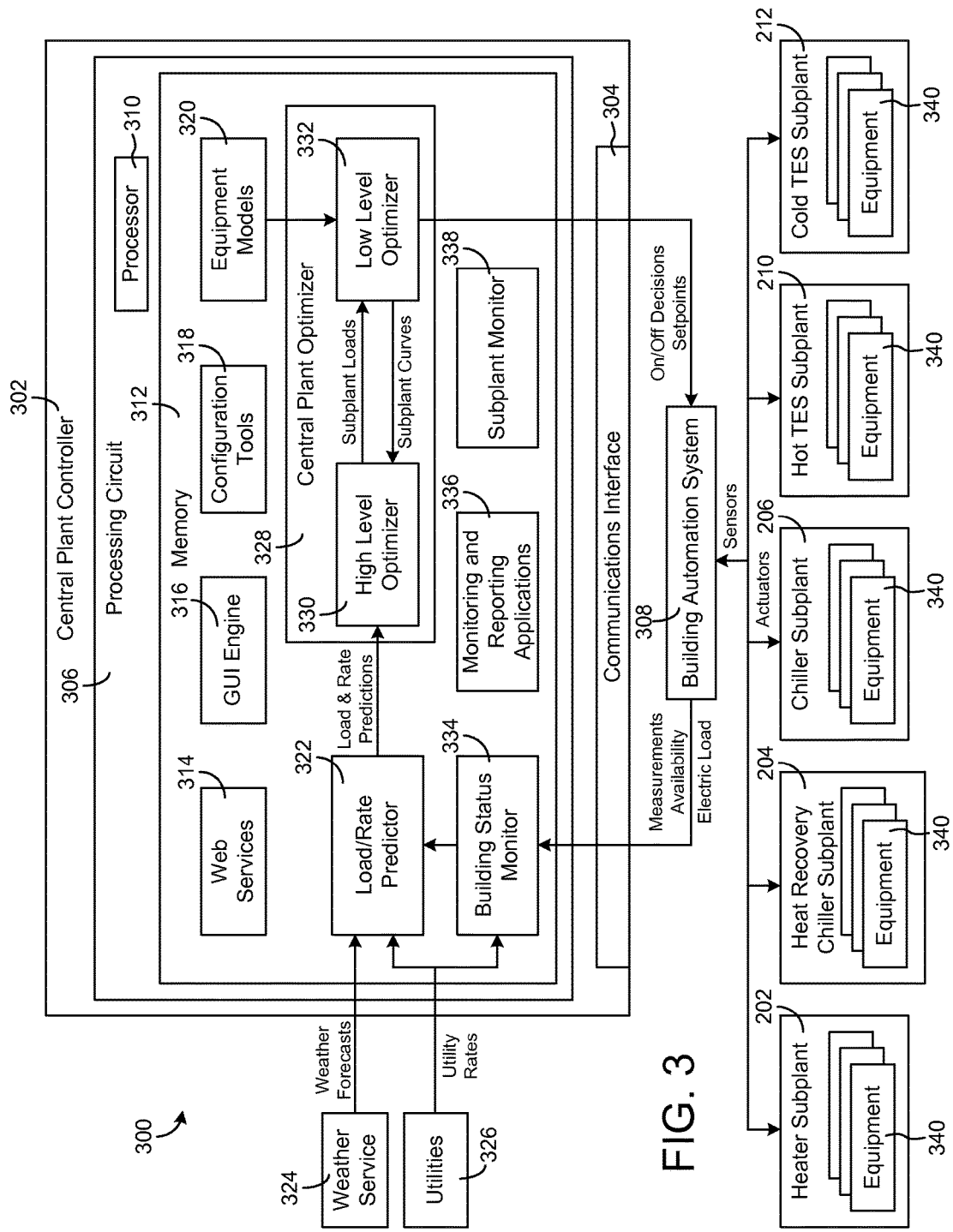
FIG. 3 is a block diagram of a central plant system including a central plant controller configured to manage the plurality of subplants of FIG. 2, according to an exemplary embodiment.

Referring now to FIG. 3, a block diagram illustrating a central plant system 300 is shown, according to an exemplary embodiment. System 300 is shown to include a central plant controller 302, a building automation system (BAS) 308, and a plurality of subplants 202-212. Subplants 202-212 may be the same as previously described with reference to FIG. 2. For example, subplants 202-212 are shown to include a heater subplant 202, a heat recovery chiller subplant 204, a chiller subplant 206, a hot TES subplant 210, and a cold TES subplant 212.

Each of subplants 202-212 is shown to include equipment 340 that can be controlled by central plant controller 302 and/or building automation system 308 to optimize the performance of central plant 200. Equipment 340 can include any of a variety of HVAC equipment operable to control an environmental condition in a building. For example, equipment 340 can include heating devices 220, chillers 232, heat recovery heat exchangers 226, cooling towers 238, thermal energy storage devices 242-244, pumps, valves, other devices of subplants 202-212, or any other type of HVAC equipment or central plant equipment. Individual devices of equipment 340 can be turned on or off to adjust the thermal energy load served by each of subplants 202-212. In some embodiments, individual devices of equipment 340 can be operated at variable capacities (e.g., operating a chiller at 10% capacity or 60% capacity) according to an operating setpoint received from central plant controller 302.

In some embodiments, one or more of subplants 202-212 includes a subplant level controller configured to control the equipment 340 of the corresponding subplant. For example, central plant controller 302 may determine an on/off configuration and global operating setpoints for equipment 340. In response to the on/off configuration and received global operating setpoints, the subplant controllers may turn individual devices of equipment 340 on or off, and implement specific operating setpoints (e.g., damper position, vane position, fan speed, pump speed, etc.) to reach or maintain the global operating setpoints.

In some embodiments, the subplant level controllers receive subplant load setpoints from central plant controller 302. Each subplant level controller may use the subplant load setpoint for the corresponding subplant to select one or more devices of the equipment 340 within the subplant to activate or deactivate in order to meet the subplant load setpoint in an energy-efficient manner. In other embodiments, the equipment selection and staging decisions (i.e., deciding which devices to turn on/off) are performed by a low level optimizer 332 within central plant controller 302.

BAS 308 may be configured to monitor conditions within a controlled building or building zone. For example, BAS 308 may receive input from various sensors (e.g., temperature sensors, humidity sensors, airflow sensors, voltage sensors, etc.) distributed throughout the building and may report building conditions to central plant controller 302. Building conditions may include, for example, a temperature of the building or a zone of the building, a power consumption (e.g., electric load) of the building, a state of one or more actuators configured to affect a controlled state within the building, or other types of information relating to the controlled building. BAS 308 may operate subplants 202-212 to affect the monitored conditions within the building and/or to serve the thermal energy loads of the building.

BAS 308 may receive control signals from central plant controller 302 specifying on/off states and/or setpoints for equipment 340. BAS 308 may control equipment 340 (e.g., via actuators, power relays, etc.) in accordance with the control signals provided by central plant controller 302. For example, BAS 308 may operate equipment 340 using closed loop control to achieve the setpoints specified by central plant controller 302. BAS 308 may be combined with central plant controller 302 or may be part of a separate building automation system. In some embodiments, BAS 308 is a METASYS brand building automation system or VERASYS brand building automation system, as sold by Johnson Controls, Inc. Several examples of building automation systems which can be used as BAS 308 are described in detail in U.S. patent application Ser. No. 15/182,580 filed Jun. 14, 2016, and U.S. patent application Ser. No. 15/179,894 filed Jun. 10, 2016. The entire disclosures of both of these patent applications are incorporated by reference herein.

Central plant controller 302 may monitor the status of the controlled building using information received from BAS 308. Central plant controller 302 may be configured to predict the thermal energy loads (e.g., heating loads, cooling loads, etc.) of the building for plurality of time steps in a prediction window (e.g., using weather forecasts from a weather service 324). Central plant controller 302 may generate on/off decisions and/or setpoints for equipment 340 to minimize the cost of energy consumed by subplants 202-212 to serve the predicted heating and/or cooling loads for the duration of the prediction window. According to an exemplary embodiment, central plant controller 302 is integrated within a single computer (e.g., one server, one housing, etc.). In various other exemplary embodiments, central plant controller 302 can be distributed across multiple servers or computers (e.g., that can exist in distributed locations). In another exemplary embodiment, central plant controller 302 is integrated with a smart building manager that manages multiple building systems and/or combined with BAS 308.

Central plant controller 302 is shown to include a communications interface 304 and a processing circuit 306. Communications interface 304 may include wired or wireless interfaces (e.g., jacks, antennas, transmitters, receivers, transceivers, wire terminals, etc.) for conducting data communications with various systems, devices, or networks. For example, communications interface 304 may include an Ethernet card and port for sending and receiving data via an Ethernet-based communications network and/or a WiFi transceiver for communicating via a wireless communications network. Communications interface 304 may be configured to communicate via local area networks or wide area networks (e.g., the Internet, a building WAN, etc.) and may use a variety of communications protocols (e.g., BACnet, IP, LON, etc.).

Communications interface 304 may be a network interface configured to facilitate electronic data communications between central plant controller 302 and various external systems or devices (e.g., BAS 308, subplants 202-212, etc.). For example, central plant controller 302 may receive information from BAS 308 indicating one or more measured states of the controlled building (e.g., temperature, humidity, electric loads, etc.) and one or more states of subplants 202-212 (e.g., equipment status, power consumption, equipment availability, etc.). Communications interface 304 may receive inputs from BAS 308 and/or subplants 202-212 and may provide operating parameters (e.g., on/off decisions, setpoints, etc.) to subplants 202-212 via BAS 308. The operating parameters may cause subplants 202-212 to activate, deactivate, or adjust a setpoint for various devices of equipment 340.

Still referring to FIG. 3, processing circuit 306 is shown to include a processor 310 and memory 312. Processor 310 may be a general purpose or specific purpose processor, an application specific integrated circuit (ASIC), one or more field programmable gate arrays (FPGAs), a group of processing components, or other suitable processing components. Processor 310 may be configured to execute computer code or instructions stored in memory 312 or received from other computer readable media (e.g., CDROM, network storage, a remote server, etc.).

Memory 312 may include one or more devices (e.g., memory units, memory devices, storage devices, etc.) for storing data and/or computer code for completing and/or facilitating the various processes described in the present disclosure. Memory 312 may include random access memory (RAM), read-only memory (ROM), hard drive storage, temporary storage, non-volatile memory, flash memory, optical memory, or any other suitable memory for storing software objects and/or computer instructions. Memory 312 may include database components, object code components, script components, or any other type of information structure for supporting the various activities and information structures described in the present disclosure. Memory 312 may be communicably connected to processor 310 via processing circuit 306 and may include computer code for executing (e.g., by processor 310) one or more processes described herein.

Still referring to FIG. 3, memory 312 is shown to include a building status monitor 334. Central plant controller 302 may receive data regarding the overall building or building space to be heated or cooled with central plant 200 via building status monitor 334. In an exemplary embodiment, building status monitor 334 may include a graphical user interface component configured to provide graphical user interfaces to a user for selecting building requirements (e.g., overall temperature parameters, selecting schedules for the building, selecting different temperature levels for different building zones, etc.).

Central plant controller 302 may determine on/off configurations and operating setpoints to satisfy the building requirements received from building status monitor 334. In some embodiments, building status monitor 334 receives, collects, stores, and/or transmits cooling load requirements, building temperature setpoints, occupancy data, weather data, energy data, schedule data, and other building parameters. In some embodiments, building status monitor 334 stores data regarding energy costs, such as pricing information available from utilities 326 (energy charge, demand charge, etc.).

Still referring to FIG. 3, memory 312 is shown to include a load/rate predictor 322. Load/rate predictor 322 may be configured to predict the thermal energy loads ($\hat{l}_k$) of the building or campus for each time step k (e.g., k=1 . . . n) of an optimization period. Load/rate predictor 322 is shown receiving weather forecasts from a weather service 324. In some embodiments, load/rate predictor 322 predicts the thermal energy loads $\hat{l}_k$ as a function of the weather forecasts. In some embodiments, load/rate predictor 322 uses feedback from BAS 308 to predict loads $\hat{l}_k$. Feedback from BAS 308 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 322 receives a measured electric load and/or previous measured load data from BAS 308 (e.g., via building status monitor 334). Load/rate predictor 322 may predict loads $\hat{l}_k$ as a function of a given weather forecast ($\hat{\phi}_w$), a day type (day), the time of day (t), and previous measured load data ($Y_{k-1}$). Such a relationship is expressed in the following equation:

$\hat{l}_k = f(\hat{\phi}_w, \text{day}, t | Y_{k-1})$

In some embodiments, load/rate predictor 322 uses a deterministic plus stochastic model trained from historical load data to predict loads $\hat{l}_k$. Load/rate predictor 322 may use any of a variety of prediction methods to predict loads $\hat{l}_k$ (e.g., linear regression for the deterministic portion and an AR model for the stochastic portion). Load/rate predictor 322 may predict one or more different types of loads for the building or campus. For example, load/rate predictor 322 may predict a hot water load $\hat{l}_{Hot,k}$ and a cold water load $\hat{l}_{Cold,k}$ for each time step k within the prediction window.

Load/rate predictor 322 is shown receiving utility rates from utilities 326. Utility rates may indicate a cost or price per unit of a resource (e.g., electricity, natural gas, water, etc.) provided by utilities 326 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 326 or predicted utility rates estimated by load/rate predictor 322.

In some embodiments, the utility rates include demand charges for one or more resources provided by utilities 326. A demand charge may define a separate cost imposed by utilities 326 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, central plant optimizer 328 may be configured to account for demand charges in the high level optimization process performed by high level optimizer 330. Utilities 326 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Load/rate predictor 322 may store the predicted loads $\hat{l}_k$ and the utility rates in memory 312 and/or provide the predicted loads $\hat{l}_k$ and the utility rates to central plant optimizer 328. Central plant optimizer 328 may use the predicted loads $\hat{l}_k$ and the utility rates to determine an optimal load distribution for subplants 202-212 and to generate on/off decisions and setpoints for equipment 340.

Still referring to FIG. 3, memory 312 is shown to include an central plant optimizer 328. Central plant optimizer 328 may perform a cascaded optimization process to optimize the performance of central plant 200. For example, central plant optimizer 328 is shown to include a high level optimizer 330 and a low level optimizer 332. High level optimizer 330 may control an outer (e.g., subplant level) loop of the cascaded optimization. High level optimizer 330 may determine an optimal distribution of thermal energy loads across subplants 202-212 for each time step in the prediction window in order to optimize (e.g., minimize) the cost of energy consumed by subplants 202-212. Low level optimizer 332 may control an inner (e.g., equipment level) loop of the cascaded optimization. Low level optimizer 332 may determine how to best run each subplant at the load setpoint determined by high level optimizer 330. For example, low level optimizer 332 may determine on/off states and/or operating setpoints for various devices of equipment 340 in order to optimize (e.g., minimize) the energy consumption of each subplant while meeting the thermal energy load setpoint for the subplant. The cascaded optimization process is described in greater detail with reference to FIG. 4.

Still referring to FIG. 3, memory 312 is shown to include a subplant monitor 338. Subplant monitor 338 may store historical data regarding past operating statuses, past operating setpoints, and instructions for calculating and/or implementing control parameters for subplants 202-212. Subplant monitor 338 may also receive, store, and/or transmit data regarding the conditions of individual devices of equipment 340, such as operating efficiency, equipment degradation, a date since last service, a lifespan parameter, a condition grade, or other device-specific data. Subplant monitor 338 may receive data from subplants 202-212 and/or BAS 308 via communications interface 304. Subplant monitor 338 may also receive and store on/off statuses and operating setpoints from low level optimizer 332.

Data and processing results from central plant optimizer 328, subplant monitor 338, or other modules of central plant controller 302 may be accessed by (or pushed to) monitoring and reporting applications 336. Monitoring and reporting applications 336 may be configured to generate real time system health dashboards that can be viewed and navigated by a user (e.g., a central plant engineer). For example, monitoring and reporting applications 336 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the central plant.

Still referring to FIG. 3, central plant controller 302 may include one or more GUI servers, web services 314, or GUI engines 316 to support monitoring and reporting applications 336. In various embodiments, applications 336, web services 314, and GUI engine 316 may be provided as separate components outside of central plant controller 302 (e.g., as part of a smart building manager). Central plant controller 302 may be configured to maintain detailed historical databases (e.g., relational databases, XML, databases, etc.) of relevant data and includes computer code modules that continuously, frequently, or infrequently query, aggregate, transform, search, or otherwise process the data maintained in the detailed databases. Central plant controller 302 may be configured to provide the results of any such processing to other databases, tables, XML files, or other data structures for further querying, calculation, or access by, for example, external monitoring and reporting applications.

Central plant controller 302 is shown to include configuration tools 318. Configuration tools 318 can allow a user to define (e.g., via graphical user interfaces, via prompt-driven wizards, etc.) how central plant controller 302 should react to changing conditions in the central plant subsystems. In an exemplary embodiment, configuration tools 318 allow a user to build and store condition-response scenarios that can cross multiple central plant devices, multiple building systems, and multiple enterprise control applications (e.g., work order management system applications, entity resource planning applications, etc.). For example, configuration tools 318 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 318 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Figure 4:
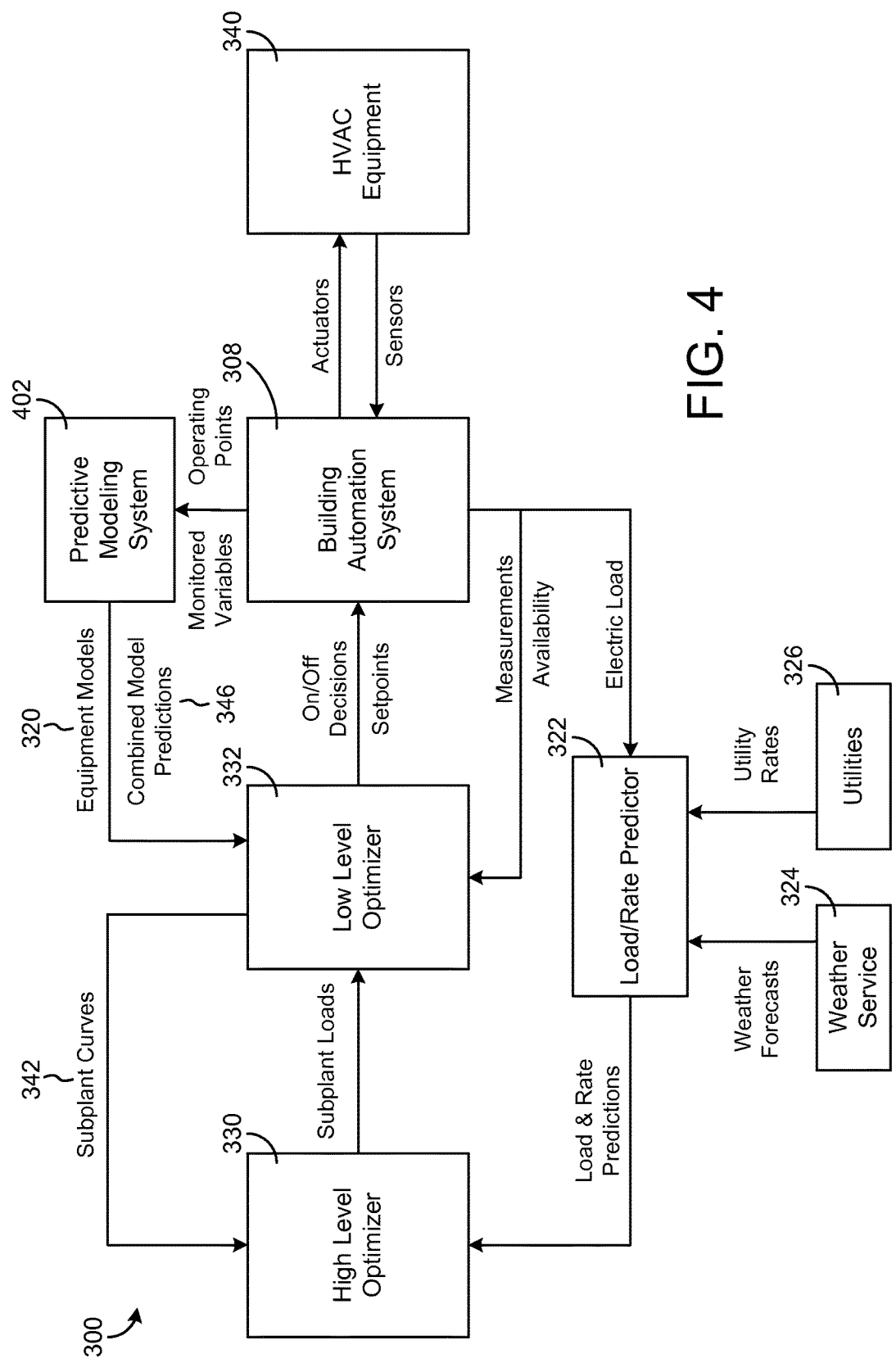
FIG. 4 is a block diagram illustrating a portion of the central plant system of FIG. 3 in greater detail and showing a predictive modeling system configured to predict the performance of HVAC equipment, according to an exemplary embodiment.

Referring now to FIG. 4, a block diagram illustrating a portion of central plant system 300 in greater detail is shown, according to an exemplary embodiment. FIG. 4 illustrates the cascaded optimization process performed by central plant optimizer 328 to optimize the performance of central plant 200. In the cascaded optimization process, high level optimizer 330 performs a subplant level optimization that determines an optimal distribution of thermal energy loads across subplants 202-212 for each time step in the prediction window in order to minimize the cost of energy consumed by subplants 202-212. Low level optimizer 332 performs an equipment level optimization that determines how to best run each subplant at the subplant load setpoint determined by high level optimizer 330. For example, low level optimizer 332 may determine on/off states and/or operating setpoints for various devices of equipment 340 in order to optimize the energy consumption of each subplant while meeting the thermal energy load setpoint for the subplant.

One advantage of the cascaded optimization process performed by central plant optimizer 328 is the optimal use of computational time. For example, the subplant level optimization performed by high level optimizer 330 may use a relatively long time horizon due to the operation of the thermal energy storage. However, the equipment level optimization performed by low level optimizer 332 may use a much shorter time horizon or no time horizon at all since the low level system dynamics are relatively fast (compared to the dynamics of the thermal energy storage) and the low level control of equipment 340 may be handled by BAS 308. Such an optimal use of computational time makes it possible for central plant optimizer 328 to perform the central plant optimization in a short amount of time, allowing for real-time predictive control. For example, the short computational time enables central plant optimizer 328 to be implemented in a real-time planning tool with interactive feedback.

Another advantage of the cascaded optimization performed by central plant optimizer 328 is that the central plant optimization problem can be split into two cascaded subproblems. The cascaded configuration provides a layer of abstraction that allows high level optimizer 330 to distribute the thermal energy loads across subplants 202-212 without requiring high level optimizer 330 to know or use any details regarding the particular equipment configuration within each subplant. The interconnections between equipment 340 within each subplant may be hidden from high level optimizer 330 and handled by low level optimizer 332. For purposes of the subplant level optimization performed by high level optimizer 330, each subplant may be completely defined by one or more subplant curves 342.

Low level optimizer 332 may generate and provide subplant curves 342 to high level optimizer 330. Subplant curves 342 may indicate the rate of utility use by each of subplants 202-212 (e.g., electricity use measured in kW, water use measured in L/s, etc.) as a function of the subplant load. In some embodiments, low level optimizer 332 generates subplant curves 342 based on equipment models 320 (e.g., by combining equipment models 320 for individual devices into an aggregate curve for the subplant). Low level optimizer 332 may generate subplant curves 342 by running the low level optimization process for several different loads and weather conditions to generate multiple data points. Low level optimizer 332 may fit a curve to the data points to generate subplant curves 342. In other embodiments, low level optimizer 332 provides the data points to high level optimizer 330 and high level optimizer 330 generates the subplant curves using the data points.

High level optimizer 330 may receive the load and rate predictions from load/rate predictor 322 and the subplant curves 342 from low level optimizer 332. The load predictions may be based on weather forecasts from weather service 324 and/or information from building automation system 308 (e.g., a current electric load of the building, measurements from the building, a history of previous loads, a setpoint trajectory, etc.). The utility rate predictions may be based on utility rates received from utilities 326 and/or utility prices from another data source. High level optimizer 330 may determine the optimal load distribution for subplants 202-212 (e.g., a subplant load for each subplant) for each time step the prediction window and may provide the subplant loads as setpoints to low level optimizer 332. In some embodiments, high level optimizer 330 determines the subplant loads by minimizing the total operating cost of central plant 200 over the prediction window. In other words, given a predicted load and utility rate information from load/rate predictor 322, high level optimizer 330 may distribute the predicted load across subplants 202-212 over the optimization period to minimize operating cost.

In some instances, the optimal load distribution may include using TES subplants 210 and/or 212 to store thermal energy during a first time step for use during a later time step. Thermal energy storage may advantageously allow thermal energy to be produced and stored during a first time period when energy prices are relatively low and subsequently retrieved and used during a second time period when energy proves are relatively high. The high level optimization may be different from the low level optimization in that the high level optimization has a longer time constant due to the thermal energy storage provided by TES subplants 210-212. The high level optimization may be described by the following equation:

$$\theta^*_{HL} = \arg\min_{\theta_{HL}} J_{HL}(\theta_{HL})$$

where $\theta^*_{HL}$ contains the optimal high level decisions (e.g., the optimal load for each of subplants 202-212) for the entire optimization period and $J_{HL}$ is the high level cost function.

To find the optimal high level decisions $\theta^*_{HL}$, high level optimizer 330 may minimize the high level cost function $J_{HL}$. The high level cost function $J_{HL}$ may be the sum of the economic (e.g., monetary) costs of each utility consumed by each of subplants 202-212 for the duration of the optimization period. In some embodiments, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the optimization period, $n_s$ is the number of subplants, $t_s$ is the duration of a time step, $c_{jk}$ is the economic cost of utility j at a time step k of the optimization period, and $u_{jik}$ is the rate of use of utility j by subplant i at time step k.

In some embodiments, the cost function $J_{HL}$ includes an additional demand charge term such as:

$$w_d c_{demand} \max_{n_h}(u_{elec}(\theta_{HL}), u_{max,ele})$$

where $w_d$ is a weighting term, $c_{demand}$ is the demand cost, and the max( ) term selects the peak electricity use during the applicable demand charge period. Accordingly, the high level cost function $J_{HL}$ may be described by the equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right] + w_d c_{demand} \max_{n_h}(u_{elec}(\theta_{HL}), u_{max,ele})$$

The decision vector $\theta_{HL}$ may be subject to several constraints. For example, the constraints may require that the subplants not operate at more than their total capacity, that the thermal storage not charge or discharge too quickly or under/over flow for the tank, and that the thermal energy loads for the building or campus are met. These restrictions may lead to both equality and inequality constraints on the high level optimization problem.

In some embodiments, the high level optimization performed by high level optimizer 330 is the same or similar to the high level optimization process described in U.S. patent application Ser. No. 14/634,609 filed Feb. 27, 2015 and titled "High Level Central Plant Optimization," the entire disclosure of which is incorporated by reference herein. High level optimizer 330 may include some or all of the features and/or functionality of the high level optimization module described in U.S. patent application Ser. No. 14/634,609.

Still referring to FIG. 4, low level optimizer 332 may use the subplant loads determined by high level optimizer 330 to determine optimal low level decisions $\theta^*_{LL}$ (e.g. binary on/off decisions, flow setpoints, temperature setpoints, etc.) for equipment 340. The low level optimization process may be performed for each of subplants 202-212. In various embodiments, the low level optimization process may be performed by centralized low level optimizer 332 that performs a separate low level optimization for each of subplants 202-212 or by a set of subplant level controllers that operate within each subplant (e.g., each subplant controller running an instance of low level optimizer 332). Low level optimizer 332 may be responsible for determining which devices of the subplant to use and/or the operating setpoints for such devices that will achieve the subplant load setpoint while minimizing energy consumption. The low level optimization may be described using the following equation:

$$\theta^*_{LL} = \arg\min_{\theta_{LL}} J_{LL}(\theta_{LL})$$

where $\theta^*_{LL}$ contains the optimal low level decisions and $J_{LL}$ is the low level cost function.

To find the optimal low level decisions $\theta^*_{LL}$, low level optimizer 332 may minimize the low level cost function $J_{LL}$. The low level cost function $J_{LL}$ may represent the total energy consumption for all of equipment 340 in the applicable subplant. The low level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of equipment 340 in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimizer 332 may minimize the low level cost function $J_{LL}$ subject to inequality constraints based on the capacities of equipment 340 and equality constraints based on energy, momentum, and/or mass balances. In some embodiments, the optimal low level decisions $\theta^*_{LL}$ are constrained by switching constraints defining a short horizon for maintaining a device in an on or off state after a binary on/off switch. The switching constraints may prevent devices from being rapidly cycled on and off. In some embodiments, low level optimizer 332 performs the equipment level optimization without considering system dynamics. The optimization process may be slow enough to safely assume that the equipment control has reached its steady-state. Thus, low level optimizer 332 may determine the optimal low level decisions $\theta^*_{LL}$ at an instance of time rather than over a long horizon.

Low level optimizer 332 may determine optimum operating statuses (e.g., on or off) for a plurality of devices of equipment 340. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimizer 332 may also determine optimum operating setpoints for equipment using nonlinear optimization. Nonlinear optimization may identify operating setpoints that further minimize the low level cost function $J_{LL}$. Low level optimizer 332 may provide the on/off decisions and setpoints to building automation system 308 for use in controlling the HVAC equipment 340.

In some embodiments, the low level optimization performed by low level optimizer 332 is the same or similar to the low level optimization process described in U.S. patent application Ser. No. 14/634,615 filed Feb. 27, 2015 and titled "Low Level Central Plant Optimization," the entire disclosure of which is incorporated by reference herein. Low level optimizer 332 may include some or all of the features and/or functionality of the low level optimization module described in U.S. patent application Ser. No. 14/634,615.

Still referring to FIG. 4, central plant system 300 is shown to include a predictive modeling system 402. Predictive modeling system 402 is shown receiving monitored variables and operating points from BAS 308. The monitored variables can include, for example, measured variables (e.g., measured temperature, measured air flow rate, etc.), calculated variables (e.g., heat capacity of a substance at a given temperature, enthalpy, coefficient of performance, etc.), control variables (e.g., setpoints, equipment operating points, on/off decisions, etc.), equipment parameters (e.g., rated load, control parameters, etc.), or any other variables that characterize the operation of various devices of HVAC equipment 340. Monitored variables can be received from BAS 308, controller 302, or directly from HVAC equipment 340. For example, monitored variables can include sensor measurements received from various sensors of HVAC equipment 340. The operating points can include setpoints (e.g., load setpoints, capacity setpoints, etc.), operating states, or other variables that indicate the current operating state of HVAC equipment 340. The operating points can be received from BAS 308 (as shown in FIG. 4), from low level optimizer 332, or from high level optimizer 330. For example, the operating points can include equipment setpoints generated by low level optimizer 332, load setpoints generated by high level optimizer 330, or other types of operating points.

Predictive modeling system 402 can be configured to generate and provide equipment models 320 and combined model predictions 346 to low level optimizer 332. Equipment models 320 can include any of a variety of models that characterize the performance of HVAC equipment 340. In some embodiments, each of equipment models 320 corresponds to an individual HVAC device of HVAC equipment 340 (e.g., an individual chiller, an individual boiler, an individual compressor, etc.) and can be used to predict the performance of the corresponding HVAC device. For example, equipment models 320 can include power consumption models that can be used to predict the power consumption of individual HVAC devices of HVAC equipment 340 at various operating points. In some embodiments, equipment models 320 can be used to predict various output variables (e.g., coefficient of performance, power consumption, etc.) of HVAC equipment 340 as a function of the monitored variables and/or operating points.

In some embodiments, equipment models 320 define power consumption as a function of equipment load and/or equipment setpoints. For example, an equipment model 320 for a chiller may define the power consumption of the chiller as a function of cold water production and/or chiller load setpoints. In general, an equipment model 320 for a particular HVAC device may define the relationship between the inputs to the HVAC device and the outputs of the HVAC device. Equipment models 320 can be used to predict an amount of input resources (e.g., electricity, water, natural gas, etc.) required to produce a desired amount of an output resource (e.g., chilled water, hot water, electricity, etc.). Equipment models 320 can be used by low level optimizer 332 to predict the power consumption of various devices of HVAC equipment 340 that will result from the on/off decisions and setpoints selected by low level optimizer 332.

As described above, low level optimizer 332 can use equipment models 320 to generate subplant curves 342 which aggregate the equipment models for a set of HVAC equipment 340 in a single subplant. Central plant optimizer 328 can use subplant curves 342 and/or equipment models 320 to optimize equipment operation. In some embodiments, central plant optimizer 328 operates as a planning tool. For example, central plant optimizer 328 can operate a simulated plant under various hypothetical scenarios to evaluate system performance under different sets of conditions. The simulated plant can be adjusted to reflect planned equipment purchases, installation of energy-efficient equipment, or other planned changes to allow central plant optimizer 328 to run various hypothetical scenarios before the changes are actually made to the physical plant. In other embodiments, central plant optimizer 328 operates as a real-time operational tool to optimize the current running conditions of a physical plant, as previously described.

In some embodiments, equipment models 320 include multiple predictive models for each device of HVAC equipment 340. Each of the predictive models for a given HVAC device may predict the same variable using a different prediction technique. For example, a first equipment model 320 for a chiller may predict the coefficient of performance (COP) of the chiller using a bi-quadratic model, whereas a second equipment model 320 for the chiller may predict the COP of the chiller using a multivariate polynomial model, and a third equipment model 320 for the chiller may predict the COP of the chiller using a liner regression model. The output or prediction of a single equipment model 320 is referred to herein as a component model prediction. Throughout this disclosure, the terms "equipment model" and "component model" are used interchangeably. Each of the equipment models 320 can use the same set of input variables or a different set of input variables to generate the component model predictions.

In some embodiments, predictive modeling system 402 uses multiple equipment models 320 for the same predicted variable to generate each combined model prediction 346. For example, predictive modeling system 402 can generate multiple different component model predictions for each predicted variable using multiple different equipment models 320. Predictive modeling system 402 can then combine the component model predictions for a given predicted variable to form a combined model prediction 346. Predictive modeling system 402 can use any of a variety of techniques to combine the component model predictions. For example, predictive modeling system 402 can use equal weighting, principal components, trimmed means, constrained or unconstrained regression, artificial neural networks, variance weighting, ensemble machine learning techniques (e.g., boosting, bagging, etc.), or any other combination technique to generate a combined model prediction 346 from multiple component model predictions. Several of these combination techniques are described in greater detail below.

Combining multiple component model predictions to form a combined model prediction 346 has several advantages. For example, different component models may use different input variables to predict the same output variable. This results in diversity of model inputs when the component model predictions are combined, which can increase the accuracy of the combined model prediction. Additionally, a diversity of component model types can improve the accuracy of the combined model prediction in circumstances when specific types of component models may lack accuracy. For example, some component model types may be more accurate than others at predicting chiller power consumption under high load conditions, but less accurate than the others at predicting chiller power consumption under low load conditions. The existence of multiple different component model types increases the probability that not all of the component models will lack accuracy under the same set of conditions. Furthermore, using multiple different component models to predict the same variable allows for outlier predictions to be identified and removed from the set of predictions before combination. This can also increase the accuracy of the combined model prediction 346 by pruning outlier predictions.

Predictive Modeling System

Figure 5:
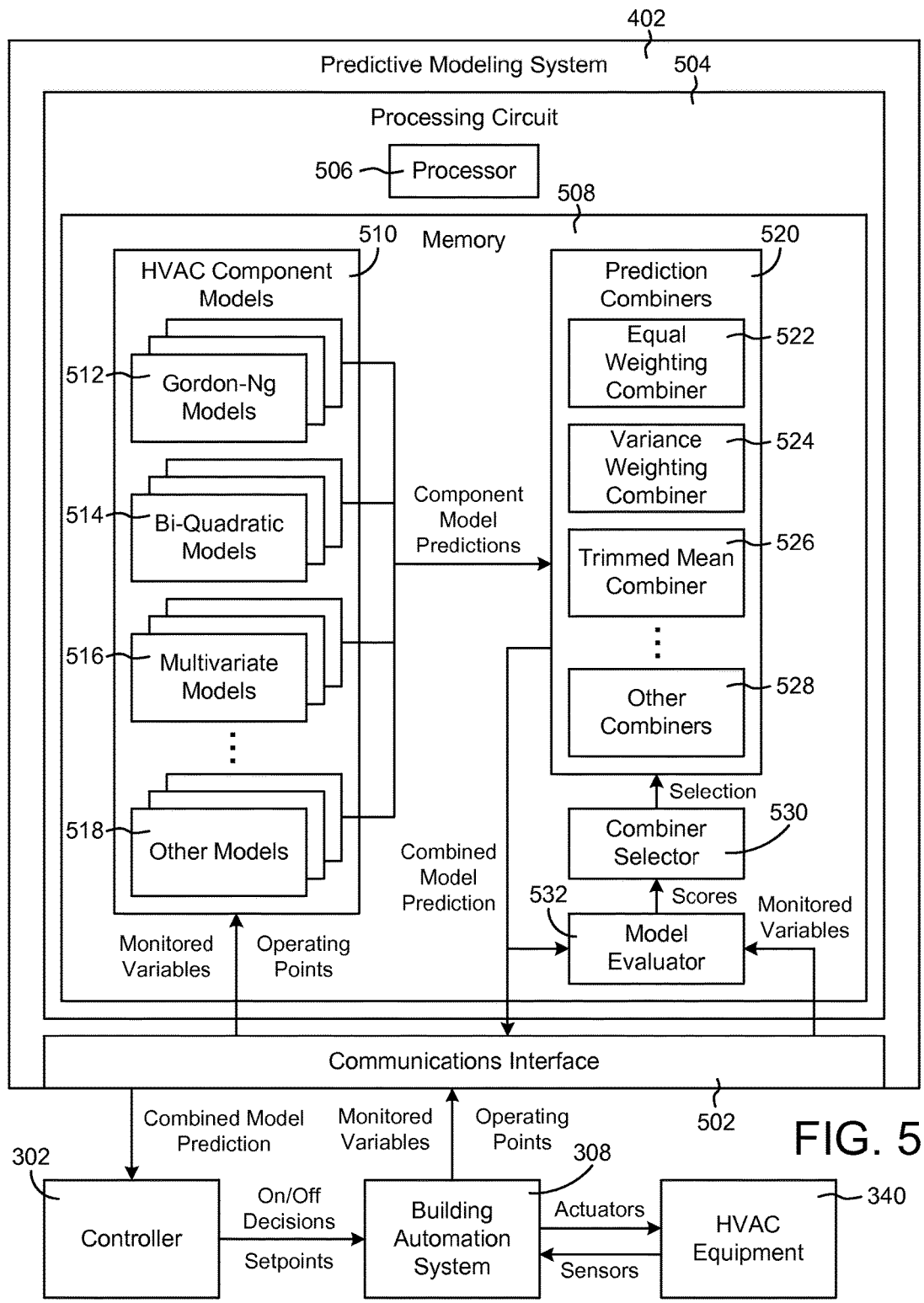
FIG. 5 is a block diagram illustrating the predictive modeling system of FIG. 4 in greater detail, according to an exemplary embodiment.

Referring now to FIG. 5, a block diagram illustrating predictive modeling system 402 in greater detail is shown, according to an exemplary embodiment. Predictive modeling system 402 is shown to include a communications interface 502 and a processing circuit 504. Communications interface 502 may include wired or wireless interfaces (e.g., jacks, antennas, transmitters, receivers, transceivers, wire terminals, etc.) for conducting data communications with various systems, devices, or networks. For example, communications interface 502 may include an Ethernet card and port for sending and receiving data via an Ethernet-based communications network and/or a WiFi transceiver for communicating via a wireless communications network. Communications interface 502 may be configured to communicate via local area networks or wide area networks (e.g., the Internet, a building WAN, etc.) and may use a variety of communications protocols (e.g., BACnet, IP, LON, etc.).

Communications interface 502 may be a network interface configured to facilitate electronic data communications between predictive modeling system 402 and various external systems or devices (e.g., BAS 308, central plant controller 302, HVAC equipment 340, etc.). For example, predictive modeling system 402 may receive samples of monitored variables and operating points from BAS 308. The monitored variables can include measured variables (e.g., measured temperature, measured air flow rate, etc.), calculated variables (e.g., heat capacity of a substance at a given temperature, enthalpy, coefficient of performance, etc.), control variables (e.g., setpoints, equipment operating points, on/off decisions, etc.), equipment parameters (e.g., rated load, control parameters, etc.), or any other variables that characterize the operation of various devices of HVAC equipment 340. The operating points can include setpoints (e.g., load setpoints, capacity setpoints, etc.), operating states, or other variables that indicate the current operating state of HVAC equipment 340. Predictive modeling system 402 can use the monitored variables and operating points to generate a combined model prediction, which can be provided to central plant controller 302 via communications interface 502.

Processing circuit 504 is shown to include a processor 506 and memory 508. Processor 506 may be a general purpose or specific purpose processor, an application specific integrated circuit (ASIC), one or more field programmable gate arrays (FPGAs), a group of processing components, or other suitable processing components. Processor 506 may be configured to execute computer code or instructions stored in memory 508 or received from other computer readable media (e.g., CDROM, network storage, a remote server, etc.).

Memory 508 may include one or more devices (e.g., memory units, memory devices, storage devices, etc.) for storing data and/or computer code for completing and/or facilitating the various processes described in the present disclosure. Memory 508 may include random access memory (RAM), read-only memory (ROM), hard drive storage, temporary storage, non-volatile memory, flash memory, optical memory, or any other suitable memory for storing software objects and/or computer instructions. Memory 508 may include database components, object code components, script components, or any other type of information structure for supporting the various activities and information structures described in the present disclosure. Memory 508 may be communicably connected to processor 506 via processing circuit 504 and may include computer code for executing (e.g., by processor 506) one or more processes described herein.

HVAC Component Models

Still referring to FIG. 5, predictive modeling system 402 is shown to include several HVAC component models 510. HVAC component models 510 can include any of a variety of predictive models configured to predict the performance of a HVAC component based on a set of input variables (e.g., monitored variables and/or operating points). In some embodiments, each of HVAC component models 510 corresponds to a particular HVAC device, a particular type of HVAC device (e.g., a chiller, a boiler, an actuator, etc.) or a particular model of HVAC device (e.g., chiller model A, chiller model B, etc.) and can be used to predict the performance of the corresponding HVAC device, device type, or model. For example, HVAC component models 510 can include power consumption models that can be used to predict the power consumption of various HVAC devices. In some embodiments, HVAC component models 510 define power consumption as a function of equipment load and/or equipment setpoints. For example, the HVAC component model for a chiller may define the power consumption of the chiller as a function of cold water production and/or chiller load setpoints.

In some embodiments, HVAC component models 510 define the relationship between the inputs to a HVAC device and the outputs of the HVAC device. HVAC component models 510 can be used to predict an amount of input resources (e.g., electricity, water, natural gas, etc.) required to produce a desired amount of an output resource (e.g., chilled water, hot water, electricity, etc.). HVAC component models 510 can be used by low level optimizer 332 to predict the power consumption of various devices of HVAC equipment 340 that will result from the on/off decisions and setpoints selected by low level optimizer 332.

In some embodiments, HVAC component models 510 are configured to predict performance-related variables (e.g., coefficient of performance, power consumption, etc.) of HVAC equipment 340 as a function of the monitored variables and/or operating points. In some embodiments, HVAC component models 510 define the coefficient of performance of a HVAC device as a function of various input variables. For example, the HVAC component model for a chiller may define the chiller's coefficient of performance COP as a function of the water temperature entering the chiller's condenser $T_{ci}$, the water temperature entering the chiller's evaporator $T_{ei}$, the water temperature leaving the chiller's evaporator $T_{eo}$, the evaporator (chiller) load $Q_e$, the chiller rated load $Q_r$, the mass flow rate of condenser (cooling) water $\dot{m}_c$, the mass flow rate of evaporator (chilled) water $\dot{m}_e$, the heat capacity of water at condenser temperature $cp_c$, the heat capacity of water at evaporator temperature $cp_e$, and/or other variables that can be provided as inputs to HVAC component models 510. An example chiller and a set of variables which can be included in HVAC component models 510 for the chiller are described in greater detail with reference to FIG. 6.

In some embodiments, HVAC component models 510 include multiple predictive models for each HVAC device of HVAC equipment 340. Each of HVAC component models 510 may predict the same variable using a different prediction technique. For example, HVAC component models 510 are shown to include Gordon-Ng models 512, bi-quadratic models 514, multivariate models 516, and other models 518. Gordon-Ng models 512 can be configured to predict the value of a performance variable (e.g., coefficient of performance, power consumption, etc.) using a Gordon-Ng prediction technique. Similarly, bi-quadratic models 514 can be configured to predict the value of the same performance variable using a bi-quadratic prediction technique, and multivariate models 516 can be configured to predict the value of the same performance variable using a multivariate prediction technique. These and several other prediction techniques which can be used by HVAC component models 510 are described in greater detail below.

Each of HVAC component models 510 can be configured to predict the same performance variable. For example, each of the HVAC component models 510 for a chiller can independently predict the coefficient of performance of the chiller, resulting in multiple independent predictions. Different HVAC component models 510 can use the same set of input variables or different sets of input variables to perform their predictions. Each of the predictions generated by HVAC component models 510 (i.e., the component model predictions) can be provided as an output to prediction combiners 520.

Several examples of HVAC component models 510 are described in the following paragraphs. Although HVAC component models 510 are described primarily with reference to a chiller and include chiller-related variables, it should be understood that HVAC component models 510 can model the performance of any type of HVAC equipment or building equipment. For example, HVAC component models 510 can model the performance of chillers, air handling units, actuators, pumps, valves, boilers, thermal energy storage, electrical energy storage (e.g., batteries), or other types of HVAC equipment or HVAC equipment 340. HVAC component models 510 for different types of equipment can include different variables (e.g., different predictor variables, different performance variables, etc.) in addition to or in place of the chiller-specific variables included in the models below.

HVAC component models 510 are shown to include Gordon-Ng models 512. In some embodiments, Gordon-Ng models 512 include a Gordon-Ng universal model with entering evaporator temperature (GN-U $T_{ei}$). This model is derived from thermodynamic and heat transfer principles in the chiller, and it has three independent variables and three parameters. The GN-U $T_{ei}$ model has a functional form of:

$$\frac{T_{ei}}{T_{ci}}\left[1 + \frac{1}{COP}\right] - 1 = \beta_1\left(\frac{T_{ei}}{Q_e}\right) + \beta_2\left(\frac{T_{ci} - T_{ei}}{T_{ci}Q_e}\right) + \beta_3\left(\frac{Q_e}{T_{ci}}\left[1 + \frac{1}{COP}\right]\right)$$

where $T_{ei}$ is the temperature of the water entering the evaporator, $T_{ci}$ is the temperature of the water entering the condenser, $Q_e$ is the evaporator (chiller) load, and COP is the coefficient of performance of the chiller. The parameters $\beta_1$, $\beta_2$, and $\beta_3$ are regression model parameters and can be identified by fitting the model to a set of training data. In some embodiments, the GN-U $T_{ei}$ model is a regression model with no constant term and three parameters. It has the advantage of being based on physical quantities and first principles.

In some embodiments, Gordon-Ng models 512 include a Gordon-Ng universal model with leaving evaporator temperature (GN-U $T_{eo}$). This model is a modification of the Gordon-Ng universal model GN-U $T_{ei}$ where the temperature of the water leaving the evaporator $T_{eo}$ is used in place of the temperature of the water entering the evaporator $T_{ei}$. The GN-U $T_{eo}$ model has a functional form of:

$$\frac{T_{eo}}{T_{ci}}\left[1 + \frac{1}{COP}\right] - 1 = \beta_1\left(\frac{T_{eo}}{Q_e}\right) + \beta_2\left(\frac{T_{ci} - T_{eo}}{T_{ci}Q_e}\right) + \beta_3\left(\frac{Q_e}{T_{ci}}\left[1 + \frac{1}{COP}\right]\right)$$

where $T_{eo}$ is the temperature of the water leaving the evaporator, $T_{ci}$ is the temperature of the water entering the condenser, $Q_e$ is the evaporator (chiller) load, and COP is the coefficient of performance of the chiller. The parameters $\beta_1$, $\beta_2$, and $\beta_3$ are regression model parameters and can be identified by fitting the model to a set of training data. In some embodiments, the GN-U $T_{eo}$ model is a regression model with no constant term, three independent variables, and three parameters. It has the advantage of being based on physical quantities and first principles.

In some embodiments, Gordon-Ng models 512 include a Gordon-Ng model with leaving evaporator temperature and condenser/evaporator flows (GN-KN). This model was developed as at Johnson Controls Inc. as a modification to the Gordon-Ng universal chiller model GN-U $T_{ei}$. The modifications to the original model include water mass flow in the condenser $\dot{m}_c$ and the evaporator $\dot{m}_e$ as well as a substitution of the water temperature leaving the evaporator $T_{eo}$ for the water temperature entering the evaporator $T_{ei}$. The GN-KN model has a functional form of:

$$\frac{T_{eo}}{T_{ci}}\left[1 + \frac{1}{COP}\right] - 1 = \beta_1\left(\frac{T_{eo}}{Q_e}\right) + \beta_2\left(\frac{T_{ci} - T_{eo}}{T_{ci}Q_e}\right) +$$
$$\beta_3\left(\frac{Q_e}{T_{ci}\dot{m}_c cp_c}\left[1 + \frac{1}{COP}\right]\right) + \beta_4\left(\frac{Q_e}{T_{ci}\dot{m}_e cp_e}\left[1 + \frac{1}{COP}\right]\right)$$

where $T_{eo}$ is the temperature of the water leaving the evaporator, $T_{ci}$ is the temperature of the water entering the condenser, $Q_e$, is the evaporator (chiller) load, $\dot{m}_c$ is the mass flow rate of the cooling water in the condenser, $\dot{m}_e$ is the mass flow rate of the chilled water in the evaporator, $cp_c$ is the heat capacity of water at the temperature of the condenser, $cp_e$ is the heat capacity of water at the temperature of the evaporator, and COP is the coefficient of performance of the chiller. The parameters $\beta_1$, $\beta_2$, $\beta_3$ and $\beta_4$ are regression model parameters and can be identified by fitting the model to a set of training data. In some embodiments, the GN-KN model is a regression model with no constant term and four parameters. It has the advantage of being based on physical quantities and first principles.

In some embodiments, Gordon-Ng models 512 include a Gordon-Ng simplified model (GN-S). This version of the Gordon-Ng universal model GN-U $T_{ei}$ simplifies the left side of the equation to isolate the COP. The GN-S model has a functional form of:

$$\frac{1}{COP} = -1 + \frac{T_{ci}}{T_{eo}} + \frac{1}{Q_e}\left[-\beta_1 + \beta_2 T_{ci} - \beta_3 \frac{T_{ci}}{T_{eo}}\right]$$

where $T_{eo}$ is the temperature of the water leaving the evaporator, $T_{ci}$ is the temperature of the water entering the condenser, $Q_e$ is the evaporator (chiller) load, and COP is the coefficient of performance of the chiller. The parameters $\beta_1$, $\beta_2$, and $\beta_3$ are regression model parameters and can be identified by fitting the model to a set of training data. The GN-S model has the advantage of being based on physical quantities and first principles.

Still referring to FIG. 5, HVAC component models 510 are shown to include bi-quadratic models 514. In some embodiments, bi-quadratic models 514 include a simple bi-quadratic model (BQ) which uses only two independent variables, the evaporator (chiller) load $Q_e$ and the temperature of the water entering the condenser $T_{ci}$. The BQ model has a functional form of:

$$\frac{1}{COP} = \beta_1 + \beta_2\left(\frac{1}{Q_e}\right) + \beta_3 Q_e + \beta_4\left(\frac{T_{ci}}{Q_e}\right) + \beta_5\left(\frac{T_{ci}^2}{Q_e}\right) + \beta_6 T_{ci} + \beta_7 Q_e T_{ci} + \beta_8 T_{ci}^2 + \beta_9 Q_e T_{ci}^2$$

where $T_{ci}$ is the temperature of the water entering the condenser, $Q_e$ is the evaporator (chiller) load, and COP is the coefficient of performance of the chiller. The parameters $\beta_1$-$\beta_9$ are regression model parameters and can be identified by fitting the model to a set of training data.

In some embodiments, bi-quadratic models 514 include a bi-quadratic model (BQ-D) which uses two independent variables, lift and part load ratio. The form of the BQ-D model has been altered from the original BQ model by pulling out some constants that can be grouped into the parameters. The BQ-D model has a functional form of:

$$\frac{1}{COP} = \beta_1 + \beta_2\left(\frac{Q_e}{Q_r}\right) + \beta_3\left(\frac{Q_e}{Q_r}\right)^2 + \beta_4(T_{ci} - T_{eo}) + \beta_5(T_{ci} - T_{eo})^2 + \beta_6\left((T_{ci} - T_{eo})\left(\frac{Q_e}{Q_r}\right)\right)$$

where the ratio of chiller load $Q_e$ to chiller rated load $Q_r$ is the part load ratio (i.e., PLR=$Q_e/Q_r$) and the difference between the temperature of the water entering the condenser $T_{ci}$ and the temperature of the water leaving the evaporator $T_{eo}$ is the lift (i.e., Lift=$T_{ci}$-$T_{eo}$). The parameters $\beta_1$-$\beta_6$ are regression model parameters and can be identified by fitting the model to a set of training data.

In some embodiments, bi-quadratic models 514 include a bi-quadratic model (BQ-V) which incorporates an additional Lift*PLR$^2$ term in the model's functional form. The BQ-V model has two independent variables, seven parameters, and a functional form of:

$$\frac{1}{COP} = \beta_1 + \beta_2\left(\frac{Q_e}{Q_r}\right) + \beta_3\left(\frac{Q_e}{Q_r}\right)^2 + \beta_4(T_{ci} - T_{eo}) + \beta_5(T_{ci} - T_{eo})^2 + \beta_6\left((T_{ci} - T_{eo})\left(\frac{Q_e}{Q_r}\right)\right) + \beta_7\left((T_{ci} - T_{eo})\left(\frac{Q_e}{Q_r}\right)\right)^2$$

where the ratio of chiller load $Q_e$ to chiller rated load $Q_r$ is the part load ratio (i.e., PLR=$Q_e/Q_r$) and the difference between the temperature of the water entering the condenser $T_{ci}$ and the temperature of the water leaving the evaporator $T_{eo}$ is the lift (i.e., Lift=$T_{ci}$-$T_{eo}$). The parameters $\beta_1$-$\beta_7$ are regression model parameters and can be identified by fitting the model to a set of training data.

Still referring to FIG. 5, HVAC component models 510 are shown to include multivariate models 516. In some embodiments, multivariate models 516 include a multivariate polynomial model (MP). The MP model was used by the U.S. Department of Energy to do predictive modeling of chillers. The MP model has a functional form of:

$$COP = \beta_1 + \beta_2 Q_e + \beta_3 T_{ei} + \beta_4 T_{ci} + \beta_5 Q_e^2 + \beta_6 T_{ei}^2 + \beta_7 T_{ci}^2 + \beta_8 Q_e T_{ei} + \beta_9 Q_e T_{ci} + \beta_{10} T_{ei} T_{ci}$$

The MP model uses three independent variables, the evaporator (chiller) load $Q_e$, the temperature of the water entering the evaporator $T_{ei}$, and the temperature of the water entering the condenser $T_{ci}$. The MP model uses seven parameters $\beta_1$-$\beta_7$ which can be identified by fitting the model to a set of training data.

In some embodiments, multivariate models 516 include an inverted multivariate polynomial model (MP-I). The MP-I model is the same as the MP model with the exception that it uses $$\frac{1}{COP}$$

on the left hand side of the equation. The MP-I model has a functional form of:

$$\frac{1}{COP} = \beta_1 + \beta_2 Q_e + \beta_3 T_{ei} + \beta_4 T_{ci} + \beta_5 Q_e^2 + \beta_6 T_{ei}^2 + \beta_7 T_{ci}^2 + \beta_8 Q_e T_{ei} + \beta_9 Q_e T_{ci} + \beta_{10} T_{ei} T_{ci}$$

The MP-I model uses three independent variables, the evaporator (chiller) load $Q_e$, the temperature of the water entering the evaporator $T_{ei}$, and the temperature of the water entering the condenser $T_{ci}$. The MP-I model uses seven parameters $\beta_1$-$\beta_7$ which can be identified by fitting the model to a set of training data Still referring to FIG. 5, HVAC component models 510 are shown to include other component models 518. Other component models 518 can include any type of HVAC component model other than Gordon-Ng models 512, bi-quadratic models 514, and multivariate models 516. For example, other component models 518 can include Lee's simplified model (LS). The LS model is based off of the NTU-ε method for heat exchangers, which allows for the COP of a heat exchanger to be modeled without requiring a measurement of the outlet temperatures for the condenser $T_{co}$ or evaporator $T_{eo}$. The LS model is derived from the first two laws of thermodynamics and has a functional form of:

$$\frac{1}{COP} = -1 + \frac{T_{ci}}{T_{ei}} + \frac{1}{Q_e}\left[-\beta_1 + \beta_2 T_{ci} - \beta_3 \frac{T_{ci}}{T_{ei}}\right]$$

which uses three variables, the evaporator (chiller) load $Q_e$, the water temperature entering the evaporator $T_{ei}$, and the water temperature entering the condenser $T_{ci}$. The LS model also uses three parameters $\beta_1$-$\beta_3$ which can be identified by fitting the model to a set of training data.

In some embodiments, other component models 518 include a simple linear regression model (SL). The SL model uses three independent variables and has a functional form of:

$$COP=\beta_1 Q_e + \beta_2 T_{ei} + \beta_3 T_{ci}$$

where $Q_e$ is the evaporator (chiller) load, $T_{ei}$ is the temperature of the water entering the evaporator, and $T_{ci}$ is the temperature of the water entering the condenser. The SL model also uses three parameters $\beta_1$-$\beta_3$ which can be identified by fitting the model to a set of training data.

In some embodiments, other component models 518 include an inverted simple linear regression model (SL-I). The SL-I model is the same as the SL model with the exception that it uses $$\frac{1}{COP}$$

on the left hand side of the equation. The SL-I model has a functional form of:

$$\frac{1}{COP} = \beta_1 Q_e + \beta_2 T_{ei} + \beta_3 T_{ci}$$

where $Q_e$ is the evaporator (chiller) load, $T_{ei}$ is the temperature of the water entering the evaporator, and $T_{ci}$ is the temperature of the water entering the condenser. The SL-I model also uses three parameters $\beta_1$-$\beta_3$ which can be identified by fitting the model to a set of training data.

In some embodiments, each of HVAC component models 510 provides a component model prediction to prediction combiners 520. The component model predictions can include a predicted value for a variable in HVAC component models 510 (e.g., COP). The predicted value can be calculated as a function of the other variables in the HVAC component models 510. For example, each of HVAC component models 510 can use the corresponding model (i.e., the functional forms identified above) to solve for COP as a function of the other variables in the corresponding model (e.g., $T_{ci}$, $T_{ei}$, $Q_e$, etc.). In some embodiments, each of HVAC component models 510 provides a predicted value for the same variable. This allows prediction combiners 520 to combine the component model predictions using a systematic method to generate the combined model prediction.

Prediction Combiners

Still referring to FIG. 5, predictive modeling system 402 is shown to include several prediction combiners 520. Prediction combiners 520 can be configured to combine multiple component model predictions to generate a single combined model prediction. For example, prediction combiners 520 are shown receiving a plurality of component model predictions from HVAC component models 510. Prediction combiners 520 can use any of a variety of techniques to combine the component model predictions (e.g., equal weighting, variance weighting, trimmed mean, etc.). Several of these techniques are described in detail below.

Prediction combiners 520 are shown to include an equal weighting combiner 522. Equal weighting combiner 522 can combine multiple component model predictions by calculating an equal-weight average of the multiple component model predictions. For example, equal weighting combiner 522 can generate the combined model prediction $\hat{y}$ by averaging multiple component model predictions $\hat{x}_1 \ldots \hat{x}_N$ as shown in the following equation:

$$\hat{y} = \frac{1}{N}\sum_{i=1}^{N} \hat{x}_i$$

where $\hat{y}$ is the combined model prediction, $\hat{x}_i$ is the ith component model prediction, and N is the total number of component model predictions.

In some embodiments, equal weighting combiner 522 assigns an equal weight to each of the component model predictions. In some embodiments, the assigned weights sum to one. Accordingly, equal weighting combiner 522 can calculate each weight by dividing the number one by the total number of component model predictions, as shown in the following equation:

$$[w_1 \ldots w_N]^T = \frac{1}{N}$$

where $[w_1 \ldots w_N]^T$ is a vector of the assigned weights and N is the total number of component model predictions. In other embodiments, the assigned weights can sum to a number other than one. For example, if unconstrained regression is used to combine the component model predictions, the assigned weights can sum to a number greater than one or less than one.

Equal weighting combiner 522 can generate the combined model prediction $\hat{y}$ by calculating a weighted sum of the component model predictions $\hat{x}_1 \ldots \hat{x}_N$, as shown in the following equation:

$$\hat{y} = \sum_{i=1}^{N} w_i \hat{x}_i$$

where $\hat{y}$ is the combined model prediction, $\hat{x}_i$ is the ith component model prediction, and $w_i$ is the calculated weight for the ith component model prediction. Since all of the calculated weights used by equal weighting combiner 522 are the same (e.g., $w_i=1/N$), this equation is functionally equivalent to the previous equation for $\hat{y}$.

The equal weighting combination performed by equal weighting combiner 522 has several advantages. For example, equal weighting is a simple technique and computationally inexpensive. Equal weighting can reduce the combined estimate error variance and often performs well. However, equal weighting does assign weights based on the performance of the individual HVAC component models 510, which might yield improved prediction.

Still referring to FIG. 5, prediction combiners 520 are shown to include a variance weighting combiner 524. Variance weighting combiner 524 can combine multiple component predictions using a variance weighting technique. In some embodiments, variance weighting combiner 524 assigns a weight to each component model prediction $\hat{x}_1 \ldots \hat{x}_N$ based on the error variance of the corresponding HVAC component model 510. For example, variance weighting combiner 524 can calculate a weight for each component model prediction using the following equation:

$$w_i = \frac{\frac{1}{\sigma_i^2}}{\sum_{i=1}^{N} \frac{1}{\sigma_i^2}}$$

where $w_i$ is the weight assigned to the ith component model prediction, $\sigma_i^2$ is the error variance of the ith component model's predictions, and N is the total number of component model predictions.

The numerator in the preceding equation is the inverse variance of the ith component model's predictions, whereas the denominator of this equation is the summation of the inverse variances of all the component models' predictions. Accordingly, each weight calculated by variance weighting combiner 524 may be inversely proportional to the variance of the corresponding component model's predictions (i.e., $w_i \propto 1/\sigma_i^2$) and the summation of the weights may be equal to one (i.e., $\Sigma_{i=1}^{N} w_i = 1$). This formulation assumes that the component model predictions $\hat{x}_1 \ldots \hat{x}_N$ are independent and have zero covariance, which in practice is a reasonable assumption. In some embodiments, variance weighting combiner 524 uses the standard deviation $\sigma_i$ instead of the variance $\sigma_i^2$ when calculating the assigned weights.

In some embodiments, variance weighting combiner 524 calculates the variance $\sigma_i^2$ for the ith HVAC component model 510 as a function of how well the component model predictions $\hat{x}_i$ fit the actual values of the predicted variable y. For example, variance weighting combiner 524 can calculate the variance $\sigma_i^2$ as a regression statistic for the ith HVAC component model 510 when the HVAC component model is trained or fit to a set of training data. The regression statistic can include, for example, the mean squared error, standard error, error variance, or other indication of how well the component model predictions $\hat{x}_i$ generated by the ith HVAC component model fit the actual values of the predicted variable y. Larger values of the regression statistic or variance $\sigma_i^2$ may indicate a relatively worse fit (i.e., worse prediction accuracy), whereas smaller values of the regression statistic or variance $\sigma_i^2$ may indicate a relatively better fit (i.e., better prediction accuracy). Variance weighting combiner 524 can repeat this process for each HVAC component models 510 to generate a corresponding variance $\sigma_i^2$ for each HVAC component model 510.

In some embodiments, variance weighting combiner 524 calculates the variance $\sigma_i^2$ for the ith HVAC component model 510 as a function of the uncertainty associated with the component model prediction $\hat{x}_i$. For example, the component model prediction $\hat{x}_i$ may be a calculated value based on one or more measured values (e.g., $T_{ci}$, $T_{ei}$, $T_{eo}$, etc.), calculated values, or other model parameters. Each of the inputs to the HVAC component models 510 can have an uncertainty associated therewith (e.g., measurement uncertainty, process uncertainty, etc.). Variance weighting combiner 524 can calculate the uncertainty of the component model prediction $\hat{x}_i$ as a function of the uncertainties associated with each the inputs to the HVAC component model. In some embodiments, variance weighting combiner 524 uses the uncertainty of the component model prediction $\hat{x}_i$ as the variance $\sigma_i^2$. Accordingly, predictions that are less certain (i.e., higher uncertainty) can be assigned a lesser weight, whereas predictions that are more certain (i.e., lower uncertainty) can be assigned a greater weight. Variance weighting combiner 524 can repeat this process for each HVAC component models 510 to generate a corresponding variance $\sigma_i^2$ for each HVAC component model 510.

Variance weighting combiner 524 can generate the combined model prediction $\hat{y}$ by calculating a weighted sum of the component model predictions $\hat{x}_1 \ldots \hat{x}_N$, as shown in the following equation:

$$\hat{y} = \sum_{i=1}^{N} w_i \hat{x}_i$$

where $\hat{y}$ is the combined model prediction, $\hat{x}_i$ is the ith component model prediction, and $w_i$ is the calculated weight for the ith component model prediction. The variance weighting technique is simple and computationally inexpensive. Advantageously, the variance weighting technique can reduce the combined estimate error variance relative to the equal weighting technique by assigning greater weights to more accurate or more certain component model predictions and lesser weights to less accurate or less certain component model predictions.

Still referring to FIG. 5, prediction combiners 520 are shown to include a trimmed mean combiner 526. Trimmed mean combiner 526 can be configured to generate the combined model prediction using a trimmed mean combination technique. In some embodiments, trimmed mean combiner 526 receives a set of component model predictions from HVAC component models 510 and identifies the value (e.g., numerical value) of each component model prediction. Trimmed mean combiner 526 can generate a trimmed or filtered subset of the component model predictions by removing one or more of the component model predictions $\hat{x}_1 \ldots \hat{x}_N$ from the initial set.

In some embodiments, trimmed mean combiner 526 selectively removes a predetermined number of the highest and/or lowest component model predictions from the initial set of component model predictions to generate the trimmed or filtered subset. For example, trimmed mean combiner 526 can remove one or more of the highest component model predictions (e.g., single highest, two highest, three highest, etc.) and/or one or more of the lowest component model predictions (e.g., single lowest, two lowest, three lowest, etc.) from the initial set of component model predictions. In other embodiments, trimmed mean combiner 526 removes one or more of the component model predictions that qualify as outliers relative to the others. For example, trimmed mean combiner 526 can remove one or more of the component model predictions that deviate from the mean of the initial set by a predetermined threshold (e.g., two standard deviations, three standard deviations, a predetermined percentage of the mean, etc.).

After the initial set of component model predictions has been trimmed or filtered by removing one or more of the component model predictions, trimmed mean combiner 526 can generate the combined model prediction using the remaining component model predictions in the trimmed or filtered subset. In some embodiments, trimmed mean combiner 526 uses the equal weighting technique or variance weighting technique described above to combine the component model predictions in the filtered subset. Advantageously, trimmed means combiner 526 can improve the accuracy of the combined model prediction by discarding the predictions from the worst performing models, which are likely to have the highest or lowest values. The trimmed means technique is computationally inexpensive and robust to outliers in the set of component model predictions.

Although only a few prediction combiners 520 are described in detail, it should be understood that prediction combiners 520 can include any type of combiner configured to generate a combined prediction by combining the predictions of multiple component models. For example, prediction combiners 520 are shown to include other combiners 528. Other combiners 528 can use any of a variety of combining techniques (e.g., principal components, constrained or unconstrained regression, artificial neural networks, ensemble machine learning techniques (e.g., boosting, bagging, etc.), to generate a combined model prediction from multiple component model predictions.

Model Evaluation and Selection

Still referring to FIG. 5, predictive modeling system 402 is shown to include a model evaluator 532. Model evaluator 532 can be configured to evaluate the performance of HVAC component models 510 and prediction combiners 520 by comparing the model-predicted values (e.g., $\hat{x}_1 \ldots \hat{x}_N$ and $\hat{y}$) to the actual values y of the predicted variable. In some embodiments, model evaluator 532 trains each of HVAC component models 510 by fitting each model to a set of training data. For example, model evaluator 532 can use a regression technique (e.g., linear regression, non-linear regression, polynomial regression, ridge regression, least squares regression, etc.) to identify values for the model coefficients of HVAC component models 510 (e.g., $\beta_1$, $\beta_2$, $\beta_3$, etc.). The set of training data can include values for each of the input variables to HVAC component models 510 and corresponding values for the predicted variable at each of a plurality of time steps. In some embodiments, the training data is defined by a data window having a predetermined duration (e.g., 60 days).

In some embodiments, model evaluator 532 uses a first portion of the training data to train HVAC component models 510 and a second portion of the training data to evaluate model performance. For example, model evaluator 532 can fit each of HVAC component models 510 to the training data in a first portion of the data window (e.g., first 30 days of data) to identify values for the model coefficients Model evaluator 532 can then apply the trained HVAC component models 510 to the training data in the second portion of the data window (e.g., second 30 days of data) to generate the component model predictions $\hat{x}_1 \ldots \hat{x}_N$ as a function of the input variables (e.g., $T_{ci}$, $T_{ei}$, $T_{eo}$, etc.). The component model predictions can then be used by prediction combiners 520 to predict values for the performance variable $\hat{y}$ (e.g., COP).

In some embodiments, the first portion of the data window is a training period and the second portion of the data window is an evaluation period. HVAC component models 510 can generate component model predictions $\hat{x}_1 \ldots \hat{x}_N$ for each time step in the evaluation period. Similarly, prediction combiners 520 generate a predicted value of the performance variable $\hat{y}$ for each time step in the evaluation period. For example, samples of the monitored variables can be collected every fifteen minutes which results in a total of 96 samples per day or 2880 samples over the duration of a 30 day evaluation period. This will result in 2880 predicted values of the performance variable $\hat{y}$ over the duration of the evaluation period. Of course, the sampling intervals and durations of the training period and evaluation period can vary depending on the particular implementation. In general, prediction combiners 520 can generate a set of n predicted values for the performance variable $\hat{y}$, where n is the total number of samples in the evaluation period.

In some embodiments, model evaluator 532 uses a sliding data window to train and evaluate HVAC component models 510. For example, the data window can be shifted forward in time by a predetermined amount (e.g., one day) to define a new set of training data. Both the training and evaluation steps can be repeated iteratively each time the data window is shifted. The sliding data window and iterative prediction/evaluation technique are described in greater detail with reference to FIG. 7.

Model evaluator 532 can be configured to evaluate the combined model predictions $\hat{y}$ generated by each of prediction combiners 520 relative to the actual values y of the predicted variable. For example, model evaluator 532 can calculate the mean absolute percentage error (MAPE) of each prediction combiner 520 using the following equation:

$$MAPE_i = 100 \times \frac{\sum_{j=1}^{n} \left| \frac{\hat{y}_j - y_j}{y_j} \right|}{n} \%$$

where $MAPE_i$ is the mean absolute percentage error of the ith prediction combiner 520, $\hat{y}_j$ is the predicted value of the performance variable for the jth sample in the evaluation period, and $y_j$ is the actual value of the performance variable for the jth sample in the evaluation period. The MAPE value for a given prediction combiner 520 indicates the average error of the prediction combiner 520 over the duration of the evaluation period. For example, a value of MAPE=5% indicates that the predicted values $\hat{y}_1 \ldots \hat{y}_n$ generated by the ith prediction combiner 520 had an average prediction error of 5% relative to the actual values of the performance variable $y_1 \ldots y_n$ over the duration of the evaluation period.

Model evaluator 532 can use any of a variety of metrics to evaluate the combined model predictions $\hat{y}$ generated by each of prediction combiners 520 relative to the actual values y of the predicted variable. For example, model evaluator 532 can calculate the root mean square error (RMSE), normalized root mean square error (NRMSE), coefficient of variation of the root mean square error (CVRMSE), or any other metric to evaluate the combined model predictions. Although MAPE is described as the primary evaluation metric, it should be understood that any other evaluation metric can be used in various other embodiments.

In some embodiments, model evaluator 532 generates a score for each of prediction combiners 520 based on a result of the evaluation. For example, model evaluator 532 can assign a score to each of prediction combiners 520 based on the MAPE values for each prediction combiner 520. In some embodiments, the score is an accuracy score. Model evaluator 532 can assign higher accuracy scores to prediction combiners 520 with smaller MAPE values, and lower accuracy scores to prediction combiners 520 with larger MAPE values. The accuracy scores may indicate which of prediction combiners 520 produced the most accurate predictions, on average, over the duration of the evaluation period.

Still referring to FIG. 5, predictive modeling system 402 is shown to include a combiner selector 530. Combiner selector 530 is shown receiving scores from model evaluator 532. The scores can be MAPE scores, accuracy scores, or any other scores which indicate the prediction accuracy of prediction combiners 520. In some embodiments, combiner selector 530 is configured to select one or more of prediction combiners 520 based on the assigned scores. For example, combiner selector 530 can select the prediction combiner 520 with the lowest MAPE score or the highest accuracy score. In some embodiments, predictive modeling system 402 is configured to use the selected prediction combiner 520 to generate the combined model prediction. For example, predictive modeling system 402 can activate or enable the selected prediction combiner 520 and deactivate or disable the non-selected prediction combiners 520.

In some embodiments, predictive modeling system 402 periodically reactivates all of the inactive prediction combiners 520 and reevaluates their performance to determine whether a different prediction combiner 520 has become more accurate. For example, some of prediction combiners 520 may be more accurate under some operating conditions (e.g., high load conditions) and less accurate under other operating conditions (e.g., low load conditions). Model evaluator 532 can reevaluate the performance of each prediction combiner 520 at regular intervals or in response to an event (e.g., the HVAC equipment transitioning into a different operating mode or state) to determine whether a different prediction combiner 520 would be more accurate than the previously-selected prediction combiner 520.

Example Chiller and Component Model Variables

Figure 6:
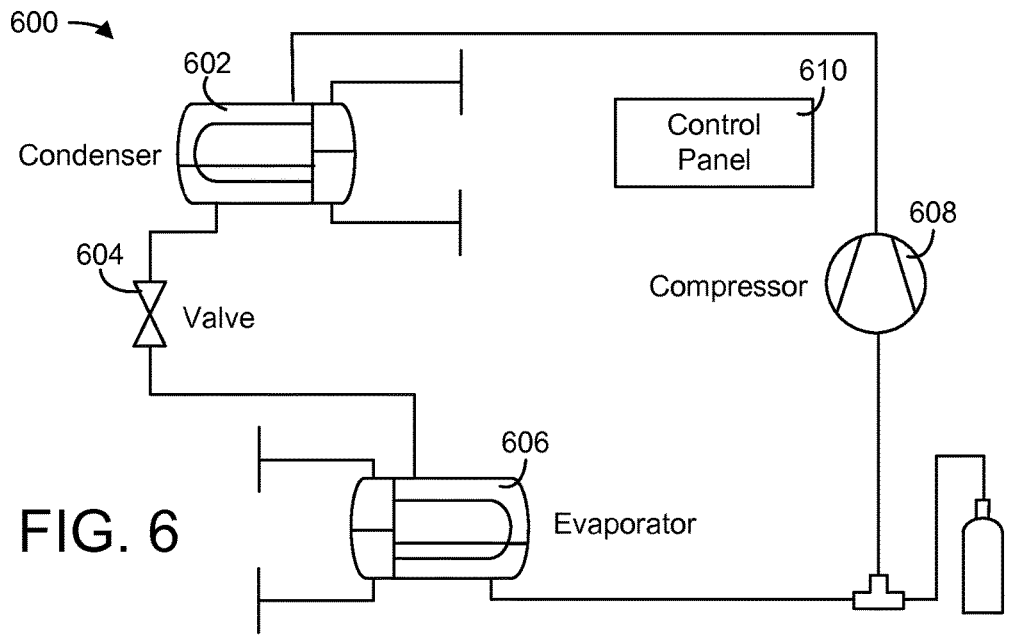
FIG. 6 is a schematic diagram of a chiller which is a type of HVAC equipment for which performance can be predictive by the predictive modeling system of FIG. 4, according to an exemplary embodiment.

Referring now to FIG. 6, a schematic diagram of a chiller 600 is shown, according to an exemplary embodiment. Chiller 600 is an example of a type of HVAC equipment 340 which can provide monitored variables and operating points to predictive modeling system 402. Chiller 600 is shown to include a refrigeration circuit having a condenser 602, an expansion valve 604, an evaporator 606, a compressor 608, and a control panel 610. In some embodiments, chiller 600 includes sensors that measure a set of monitored variables at various locations along the refrigeration circuit. Predictive modeling system 402 can use these or other variables as inputs to various component models 510 to generate component model predictions.

Table 1 below includes an exemplary set of chiller variables that can be used in component models 510. The component model variables can include monitored variables measured by sensors in chiller 600. For example, the water temperature entering the condenser $T_{ci}$, the water temperature entering the evaporator $T_{ei}$, and the water temperature leaving the evaporator $T_{eo}$ can be measured by temperature sensors located upstream and downstream of condenser 602 and evaporator 606. The monitored variables can be received from various components of central plant system 300 via communications interface 502 and provided as inputs to component models 510.

TABLE 1

Chiller Component Model Variables

| Variable | Description |
|---|---|
| COP | Coefficient of performance |
| $T_{ci}$ | Water temperature entering condenser |
| $T_{ei}$ | Water temperature entering evaporator |
| $T_{eo}$ | Water temperature leaving evaporator |
| $Q_e$ | Evaporator (chiller) load |
| $Q_r$ | Chiller rated load |
| $\dot{m}_c$ | Mass flow rate of condenser (cooling) water |
| $\dot{m}_e$ | Mass flow rate of evaporator (chilled) water |
| $cp_c$ | Heat capacity of water at condenser temperature |
| $cp_e$ | Heat capacity of water at evaporator temperature |

The component model variables can also include calculated variables. The calculated variables can be calculated based on one or more of the measured variables and/or other input variables received by predictive modeling system 402. For example, the mass flow rate of the condenser (cooling) water $\dot{m}_c$ and the mass flow rate of the evaporator (chilled) water $\dot{m}_e$ can be calculated based on flow rate measured by one or more flow sensors of chiller 600. Similarly, the heat capacity of the water at the condenser temperature $cp_c$ and the heat capacity of the water at the evaporator temperature $cp_e$ can be calculated based on the measured temperatures and known properties of water. The calculated variables can be calculated by predictive modeling system 402 based on the measured variables and/or received as inputs via communications interface 502.

The component model variables can also include fixed variables such as the chiller rated load $Q_r$ or other input variables such as the evaporator (chiller) load $Q_e$. The chiller rated load $Q_r$ can be received as an input from chiller 600, BAS 308, or other systems or devices in central plant system 300. The evaporator load $Q_e$ can be an actual or planned thermal energy load for chiller 600. In some embodiments, the evaporator load $Q_e$ is provided by central plant controller 302 as an operating point or equipment setpoint. The component model variables can also include component model predictions such as the coefficient of performance COP, resource consumption, power consumption, or other predictions which can be provided as outputs of component models 510.

Sliding Data Window

Figure 7:
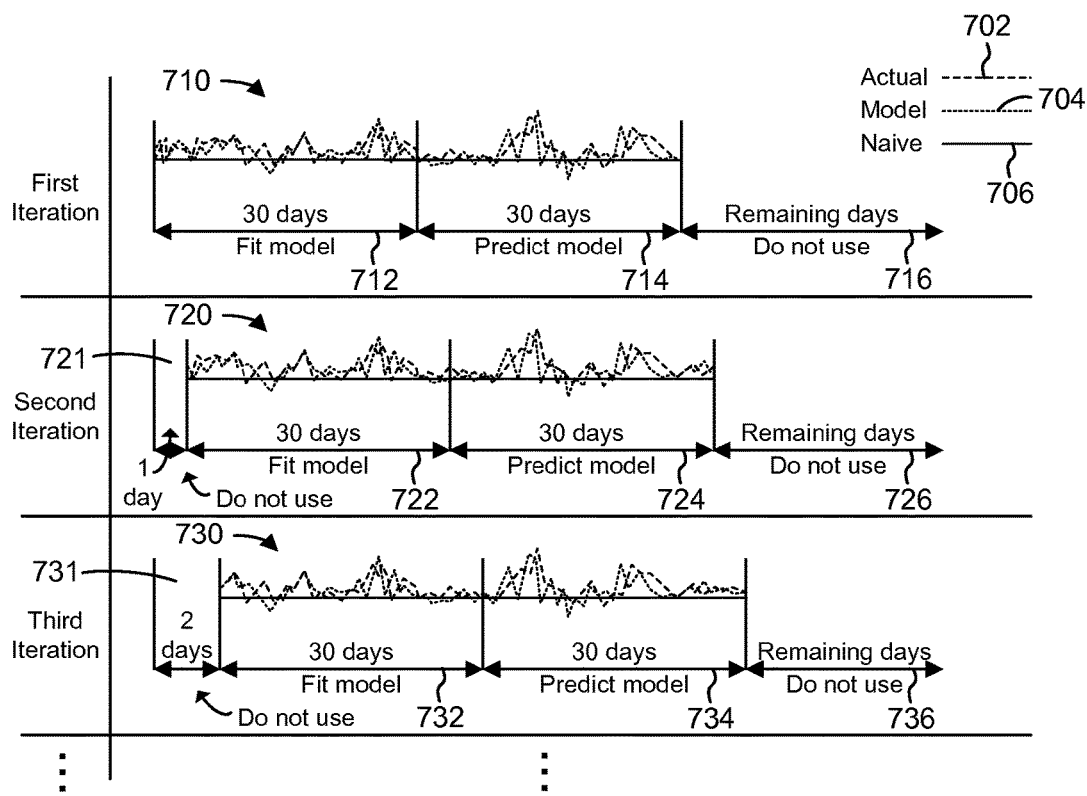
FIG. 7 is a set of graphs illustrating a sliding window and iterative prediction technique which can be used by the predictive modeling system of FIG. 4, according to an exemplary embodiment.

Referring now to FIG. 7, several graphs 710, 720, and 730 illustrating a sliding data window and iterative prediction technique which can be used by predictive modeling system 402 are shown, according to an exemplary embodiment. In all three graphs 710-730, line 702 represents the actual value of the performance variable y (e.g., actual chiller efficiency). Line 704 represents the model-predicted value of the performance variable ŷ generated by prediction combiners 520 (e.g., predicted chiller efficiency). Line 706 represents a Naïve value of the performance variable, which has a constant value (e.g., constant chiller efficiency).

In graph 710, the sliding data window is shown to include a training period 712 and an evaluation period 714. In some embodiments, training period 712 spans the first 30 days (e.g., days 1-30), whereas evaluation period 714 spans the second 30 days (e.g., days 31-60). However, it should be understood that training period 712 and evaluation period 714 can have any duration. During training period 712, model evaluator 532 uses samples of the monitored variables to train HVAC component models 510. Training HVAC component models 510 can include identifying values for the model coefficients β. For example, model evaluator 532 can use a regression technique to calculate the model coefficients β based on the values of the monitored variables (e.g., $T_{ci}$, $T_{ei}$, $T_{eo}$, etc.) and the corresponding values of the performance variable y during training period 712.

Model evaluator 532 can then apply the trained HVAC component models 510 to values of the monitored variables during evaluation period 714 to generate component model predictions $\hat{x}_1 \ldots \hat{x}_N$ for each time step in evaluation period 714. The component model predictions can then be used by prediction combiners 520 to predict values for the performance variable ŷ for each time step in evaluation period 714. The remaining days 716 are not used during the first iteration shown in graph 710.

In graph 720, the sliding data window is shifted forward by a predetermined duration (e.g., 1 day) to define a new training period 722 and a new evaluation period 724. Training data from time period 721 (e.g., the first day) is not included in either training period 722 or evaluation period 724. In some embodiments, training period 722 spans a 30 day period following time period 721 (e.g., days 2-31), whereas evaluation period 724 spans a 30 day period following training period 722 (e.g., days 32-61). During training period 722, model evaluator 532 uses samples of the monitored variables to train HVAC component models 510.

Model evaluator 532 can then apply the trained HVAC component models 510 to values of the monitored variables during evaluation period 724 to generate component model predictions $\hat{x}_1 \ldots \hat{x}_N$ for each time step in evaluation period 724. The component model predictions can then be used by prediction combiners 520 to predict values for the performance variable $\hat{y}$ for each time step in evaluation period 724. The remaining days 726 are not used during the second iteration shown in graph 720.

In graph 730, the sliding data window is shifted forward again by the predetermined duration (e.g., 1 day) to define a new training period 732 and a new evaluation period 734. Training data from time period 731 (e.g., the first two days) is not included in either training period 732 or evaluation period 734. In some embodiments, training period 732 spans a 30 day period following time period 731 (e.g., days 3-32), whereas evaluation period 734 spans a 30 day period following training period 732 (e.g., days 33-62). During training period 732, model evaluator 532 uses samples of the monitored variables to train HVAC component models 510.

Model evaluator 532 can then apply the trained HVAC component models 510 to values of the monitored variables during evaluation period 734 to generate component model predictions $\hat{x}_1 \ldots \hat{x}_N$ for each time step in evaluation period 734. The component model predictions can then be used by prediction combiners 520 to predict values for the performance variable $\hat{y}$ for each time step in evaluation period 734. The remaining days 736 are not used during the second iteration shown in graph 730. This process can be repeated until the evaluation window reaches the end of the time period for which training data has been collected.

Flow Diagrams

Referring now to FIG. 8, a flowchart of a process 800 for controlling HVAC equipment is shown, according to an exemplary embodiment. Process 800 can be performed by one or more components of central plant system 300. For example, process 800 can be performed by controller 302, predictive modeling system 402, BAS 308, and/or HVAC equipment 340, as described with reference to FIGS. 3-5.

Process 800 is shown to include determining an operating point for HVAC equipment 340 (step 802). In some embodiments, the operating point is a setpoint for HVAC equipment 340. For example, the operating point can be a load setpoint, a capacity setpoint, a setpoint for a variable affected by HVAC equipment 340, a mode setpoint, an operating state, an on/off decision, or any other variable which indicates the current operating state or condition of HVAC equipment 340. In some embodiments, the operating point is the result of an optimization procedure. For example, the operating point can be calculated by high level optimizer 330 or low level optimizer 332, as previously described.

In some embodiments, step 802 includes receiving one or more monitored variables associated with the operating point. The monitored variables can include measured variables (e.g., measured temperature, measured air flow rate, etc.), calculated variables (e.g., heat capacity of a substance at a given temperature, enthalpy, coefficient of performance, etc.), control variables (e.g., setpoints, equipment operating points, on/off decisions, etc.), equipment parameters (e.g., rated load, control parameters, etc.), or any other variables that characterize the operation of HVAC equipment 340. In some embodiments, the monitored variables are measured by one or more sensors associated with HVAC equipment 340.

Process 800 is shown to include generating a plurality of component model predictions based on the operating point (step 804). In some embodiments, each of the component model predictions is a predicted value of a performance variable indicating a predicted performance of HVAC equipment 340 at the operating point. For example, the operating point can be a setpoint for HVAC equipment 340 and the performance variable can indicate a predicted power consumption of HVAC equipment 340 at the setpoint. Each of the component model predictions can be generated by one of HVAC component models 510. In some embodiments, each of HVAC component models 510 has a different functional form and uses a different mathematical relationship to generate the corresponding component model prediction.

HVAC component models 510 can include any of a variety of predictive models configured to predict the performance of a HVAC component based on a set of input variables (e.g., monitored variables and/or operating points). In some embodiments, each of HVAC component models 510 corresponds to a particular HVAC device, a particular type of HVAC device (e.g., a chiller, a boiler, an actuator, etc.) or a particular model of HVAC device (e.g., chiller model A, chiller model B, etc.) and can be used to predict the performance of the corresponding HVAC device, device type, or model. For example, HVAC component models 510 can include power consumption models that can be used to predict the power consumption of various HVAC devices. In some embodiments, HVAC component models 510 define power consumption as a function of equipment load and/or equipment setpoints. For example, the HVAC component model for a chiller may define the power consumption of the chiller as a function of cold water production and/or chiller load setpoints.

In some embodiments, HVAC component models 510 define the relationship between the inputs to a HVAC device and the outputs of the HVAC device. HVAC component models 510 can be used to predict an amount of input resources (e.g., electricity, water, natural gas, etc.) required to produce a desired amount of an output resource (e.g., chilled water, hot water, electricity, etc.). HVAC component models 510 can be used by low level optimizer 332 to predict the power consumption of various devices of HVAC equipment 340 that will result from the on/off decisions and setpoints selected by low level optimizer 332.

In some embodiments, HVAC component models 510 are configured to predict performance-related variables (e.g., coefficient of performance, power consumption, etc.) of HVAC equipment 340 as a function of the monitored variables and/or operating points. In some embodiments, HVAC component models 510 define the coefficient of performance of a HVAC device as a function of various input variables. For example, the HVAC component model for a chiller may define the chiller's coefficient of performance COP as a function of the water temperature entering the chiller's condenser $T_{ci}$, the water temperature entering the chiller's evaporator $T_{ei}$, the water temperature leaving the chiller's evaporator $T_{eo}$, the evaporator (chiller) load $Q_e$, the chiller rated load $Q_r$, the mass flow rate of condenser (cooling) water $\dot{m}_c$, the mass flow rate of evaporator (chilled) water $\dot{m}_e$, the heat capacity of water at condenser temperature $cp_c$, the heat capacity of water at evaporator temperature $cp_e$, and/or other variables that can be provided as inputs to HVAC component models 510.

In some embodiments, HVAC component models 510 include multiple predictive models for each HVAC device of HVAC equipment 340. Each of HVAC component models 510 may predict the same variable using a different prediction technique. For example, HVAC component models 510 are shown to include Gordon-Ng models 512, bi-quadratic models 514, multivariate models 516, and other models 518. Gordon-Ng models 512 can be configured to predict the value of a performance variable (e.g., coefficient of performance, power consumption, etc.) using a Gordon-Ng prediction technique. Similarly, bi-quadratic models 514 can be configured to predict the value of the same performance variable using a bi-quadratic prediction technique, and multivariate models 516 can be configured to predict the value of the same performance variable using a multivariate prediction technique. These and several other prediction techniques which can be used by HVAC component models 510 are described in greater detail with reference to FIG. 5.

Each of HVAC component models 510 can be configured to predict the same performance variable. For example, each of HVAC component models 510 for a chiller can independently predict the coefficient of performance of the chiller, resulting in multiple independent predictions. Different HVAC component models 510 can use the same set of input variables or different sets of input variables to perform their predictions. Each of the predictions generated by HVAC component models 510 (i.e., the component model predictions) can be provided as an output to prediction combiners 520.

Still referring to FIG. 8, process 800 is shown to include combining the plurality of component model predictions to form a combined model prediction (step 806). The combined model prediction can be generated by prediction combiners 520 and can include another value of the performance variable. Prediction combiners 520 can use any of a variety of techniques to combine the component model predictions (e.g., equal weighting, variance weighting, trimmed mean, etc.). For example, step 806 can include using equal weighting combiner 522 to combine multiple component model predictions by calculating an equal-weight average of the multiple component model predictions. Equal weighting combiner 522 can generate the combined model prediction $\hat{y}$ by averaging multiple component model predictions $\hat{x}_1 \ldots \hat{x}_N$, as shown in the following equation:

$$\hat{y} = \frac{1}{N} \sum_{i=1}^{N} \hat{x}_i$$

where $\hat{y}$ is the combined model prediction, $\hat{x}_i$ is the ith component model prediction, and N is the total number of component model predictions.

In some embodiments, step 806 includes assigning an equal weight to each of the component model predictions. In some embodiments, the assigned weights sum to one. Accordingly, each weight can be calculated by dividing the number one by the total number of component model predictions, as shown in the following equation:

$$[w_1 \ldots w_N]^T = \frac{1}{N}$$

where $[w_1 \ldots w_N]^T$ is a vector of the assigned weights and N is the total number of component model predictions. In other embodiments, the assigned weights can sum to a number other than one. For example, if unconstrained regression is used to combine the component model predictions, the assigned weights can sum to a number greater than one or less than one.

Step 806 can include generating the combined model prediction $\hat{y}$ by calculating a weighted sum of the component model predictions $\hat{x}_1 \ldots \hat{x}_N$ as shown in the following equation:

$$\hat{y} = \sum_{i=1}^{N} w_i \hat{x}_i$$

where $\hat{y}$ is the combined model prediction, $\hat{x}_i$ is the ith component model prediction, and $w_i$ is the calculated weight for the ith component model prediction. Since all of the calculated weights used by equal weighting combiner 522 are the same (e.g., $w_i=1/N$), this equation is functionally equivalent to the previous equation for $\hat{y}$.

The equal weighting combination has several advantages. For example, equal weighting is a simple technique and computationally inexpensive. Equal weighting can reduce the combined estimate error variance and often performs well. However, equal weighting does assign weights based on the performance of the individual HVAC component models 510, which might yield improved prediction.

In some embodiments, step 806 includes using variance weighting combiner 524 to combine the component model predictions. Variance weighting combiner 524 can combine multiple component predictions using a variance weighting technique. In some embodiments, step 806 includes assigning a weight to each component model prediction $\hat{x}_1 \ldots \hat{x}_N$ based on the error variance of the corresponding HVAC component model 510. For example, step 806 can include calculating a weight for each component model prediction using the following equation:

$$w_i = \frac{\frac{1}{\sigma_i^2}}{\sum_{i=1}^{N} \frac{1}{\sigma_i^2}}$$

where $w_i$ is the weight assigned to the ith component model prediction, $\sigma_i^2$ is the error variance of the ith component model's predictions, and N is the total number of component model predictions.

The numerator in the preceding equation is the inverse variance of the ith component model's predictions, whereas the denominator of this equation is the summation of the inverse variances of all the component models' predictions. Accordingly, each weight calculated in step 806 may be inversely proportional to the variance of the corresponding component model's predictions (i.e., $w_i \propto 1/\sigma_i^2$) and the summation of the weights may be equal to one (i.e., $\Sigma_{i=1}^{N} w_i = 1$). This formulation assumes that the component model predictions $\hat{x}_1 \ldots \hat{x}_N$ are independent and have zero covariance, which in practice is a reasonable assumption. In some embodiments, step 806 includes using the standard deviation $\sigma_i$ instead of the variance $\sigma_i^2$ when calculating the assigned weights.

In some embodiments, step 806 includes using the variance $\sigma_i^2$ for the ith HVAC component model 510 as a function of how well the component model predictions $\hat{x}_i$ fit the actual values of the predicted variable y. For example, step 806 can include calculating the variance $\sigma_i^2$ as a regression statistic for the ith HVAC component model 510 when the HVAC component model is trained or fit to a set of training data. The regression statistic can include, for example, the mean squared error, standard error, error variance, or other indication of how well the component model predictions $\hat{x}_i$ generated by the ith HVAC component model fit the actual values of the predicted variable y. Larger values of the regression statistic or variance $\sigma_i^2$ may indicate a relatively worse fit (i.e., worse prediction accuracy), whereas smaller values of the regression statistic or variance $\sigma_i^2$ may indicate a relatively better fit (i.e., better prediction accuracy). Step 806 can include repeating this process for each HVAC component models 510 to generate a corresponding variance $\sigma_i^2$ for each HVAC component model 510.

In some embodiments, step 806 includes calculating the variance $\sigma_i^2$ for the ith HVAC component model 510 as a function of the uncertainty associated with the component model prediction $\hat{x}_i$. For example, the component model prediction $\hat{x}_i$ may be a calculated value based on one or more measured values (e.g., $T_{ci}$, $T_{ei}$, $T_{eo}$, etc.), calculated values, or other model parameters. Each of the inputs to the HVAC component models 510 can have an uncertainty associated therewith (e.g., measurement uncertainty, process uncertainty, etc.). Step 806 can include calculating the uncertainty of the component model prediction $\hat{x}_i$ as a function of the uncertainties associated with each the inputs to the HVAC component model. In some embodiments, step 806 includes using the uncertainty of the component model prediction $\hat{x}_i$ as the variance $\sigma_i^2$. Accordingly, predictions that are less certain (i.e., higher uncertainty) can be assigned a lesser weight, whereas predictions that are more certain (i.e., lower uncertainty) can be assigned a greater weight. Step 806 can include repeating this process for each HVAC component models 510 to generate a corresponding variance $\sigma_i^2$ for each HVAC component model 510.

Step 806 can include generating the combined model prediction $\hat{y}$ by calculating a weighted sum of the component model predictions $\hat{x}_1 \ldots \hat{x}_N$ as shown in the following equation:

$$\hat{y} = \sum_{i=1}^{N} w_i \hat{x}_i$$

where $\hat{y}$ is the combined model prediction, is the ith component model prediction, and $w_i$ is the calculated weight for the ith component model prediction. The variance weighting technique is simple and computationally inexpensive. Advantageously, the variance weighting technique can reduce the combined estimate error variance relative to the equal weighting technique by assigning greater weights to more accurate or more certain component model predictions and lesser weights to less accurate or less certain component model predictions.

In some embodiments, step 806 includes using trimmed mean combiner 526 to combine the component model predictions. Trimmed mean combiner 526 can be configured to generate the combined model prediction using a trimmed mean combination technique. In some embodiments, step 806 includes receiving a set of component model predictions $\hat{x}_1 \ldots \hat{x}_N$ from HVAC component models 510 and identifies the value (e.g., numerical value) of each component model prediction. Step 806 can include generating a trimmed or filtered subset of the component model predictions by removing one or more of the component model predictions $\hat{x}_1 \ldots \hat{x}_N$ from the initial set.

In some embodiments, step 806 includes selectively removing a predetermined number of the highest and/or lowest component model predictions from the initial set of component model predictions to generate the trimmed or filtered subset. For example, step 806 can include removing one or more of the highest component model predictions (e.g., single highest, two highest, three highest, etc.) and/or one or more of the lowest component model predictions (e.g., single lowest, two lowest, three lowest, etc.) from the initial set of component model predictions. In other embodiments, step 806 includes removing one or more of the component model predictions that qualify as outliers relative to the others. For example, step 806 can include removing one or more of the component model predictions that deviate from the mean of the initial set by a predetermined threshold (e.g., two standard deviations, three standard deviations, a predetermined percentage of the mean, etc.).

After the initial set of component model predictions has been trimmed or filtered by removing one or more of the component model predictions, step 806 can include generating the combined model prediction using the remaining component model predictions in the trimmed or filtered subset. In some embodiments, step 806 includes using the equal weighting technique or variance weighting technique described above to combine the component model predictions in the filtered subset. Advantageously, step 806 can improve the accuracy of the combined model prediction by discarding the predictions from the worst performing models, which are likely to have the highest or lowest values. The trimmed means technique is computationally inexpensive and robust to outliers in the set of component model predictions.

Still referring to FIG. 8, process 800 is shown to include using the combined model prediction to optimize the operating point (step 808). Step 808 can be performed by one or more components of controller 302. For example, if the combined model prediction is an estimated amount of power consumption, low level optimizer 332 can optimize the operating point by selecting an operating point which minimizes the estimated amount of power consumption. Low level optimizer 332 can combine the estimated power consumptions for multiple devices of HVAC equipment 340 to generate a subplant curve for an entire subplant. High level optimizer 330 can use the subplant curves to allocate thermal energy loads to various subplants. The allocated thermal energy loads can then be used by low level optimizer 332 to determine an optimal operating point for HVAC equipment 340. For example, low level optimizer 332 can use the allocated thermal energy load for a subplant to select optimal operating points for the HVAC equipment 340 within the subplant. In some embodiments, the optimal operating points minimize the amount of power consumed by the subplant to satisfy the thermal energy load.

Process 800 is shown to include operating the HVAC equipment at the optimized operating point (step 810). Step 810 can include providing a setpoint to HVAC equipment 340 or otherwise controlling the operation of HVAC equipment 340 to achieve the optimized operating point. HVAC equipment 340 can be configured to affect an environmental condition within a building. The environmental condition can include, for example, building temperature, humidity, air flow, air quality, lighting, or other conditions in the building.

Step 810 can include operating the HVAC equipment 340 to achieve a setpoint value for the environmental condition or to maintain the environmental condition within a range of values. For example, step 810 can include operating the HVAC equipment 340 to maintain building temperature within a predetermined temperature range. In some embodiments, the environmental condition is used as a constraint on an optimization procedure such that the HVAC equipment 340 is operated to minimize energy consumption or energy cost while maintaining the environmental condition within a predetermined range of values.

Referring now to FIG. 9, a flowchart of a process 900 for evaluating model performance and selecting one of prediction combiners 520 is shown, according to an exemplary embodiment. Process 900 can be performed by one or more components of central plant system 300. For example, process 900 can be performed by controller 302, predictive modeling system 402, BAS 308, and/or HVAC equipment 340, as described with reference to FIGS. 3-5.

Process 900 is shown to include training a plurality of HVAC component models using training data in a first portion of a data window (step 902). In some embodiments, step 902 is performed by model evaluator 532, as described with reference to FIG. 5. Step 902 can include training each of HVAC component models 510 by fitting each model to a set of training data. For example, step 902 can include using a regression technique (e.g., linear regression, non-linear regression, polynomial regression, ridge regression, least squares regression, etc.) to identify values for the model coefficients of HVAC component models 510 (e.g., $\beta_1$, $\beta_2$, $\beta_3$, etc.). The set of training data can include values for each of the input variables to HVAC component models 510 and corresponding values for the predicted variable at each of a plurality of time steps. In some embodiments, the training data is defined by a data window having a predetermined duration (e.g., 60 days).

Process 900 is shown to include generating a plurality of component model predictions for a second portion of the data window using the HVAC component models (step 904) and combining the plurality of component model predictions using a plurality of prediction combiners to form a plurality of combined model predictions for the second portion of the data window (step 906). In some embodiments, process 900 includes using a first portion of the training data to train HVAC component models 510 and a second portion of the training data to evaluate model performance. For example, step 902 can include fitting each of HVAC component models 510 to the training data in a first portion of the data window (e.g., first 30 days of data) to identify values for the model coefficients $\beta$. Step 904 can then apply the trained HVAC component models 510 to the training data in the second portion of the data window (e.g., second 30 days of data) to generate the component model predictions $\hat{x}_1 \ldots \hat{x}_N$ as a function of the input variables (e.g., $T_{ci}$, $T_{ei}$, $T_{eo}$, etc.). The component model predictions can then be used in step 906 to predict values for the performance variable $\hat{y}$ (e.g., COP).

In some embodiments, the first portion of the data window is a training period and the second portion of the data window is an evaluation period. Step 904 can generate component model predictions $\hat{x}_1 \ldots \hat{x}_N$ for each time step in the evaluation period. Similarly, step 906 can generate a predicted value of the performance variable $\hat{y}$ for each time step in the evaluation period. For example, samples of the monitored variables can be collected every fifteen minutes which results in a total of 96 samples per day or 2880 samples over the duration of a 30 day evaluation period. This will result in 2880 predicted values of the performance variable $\hat{y}$ over the duration of the evaluation period. Of course, the sampling intervals and durations of the training period and evaluation period can vary depending on the particular implementation. In general, step 906 can generate a set of n predicted values for the performance variable $\hat{y}$, where n is the total number of samples in the evaluation period.

Still referring to FIG. 9, process 900 is shown to include calculating a score for each of the prediction combiners by comparing the combined model predictions to actual values of the predicted variable in the second portion of the data window (step 908). Step 908 can include evaluating the combined model predictions $\hat{y}$ generated by each of prediction combiners 520 relative to the actual values y of the predicted variable. For example, step 908 can include calculating the mean absolute percentage error (MAPE) of each prediction combiner 520 using the following equation:

$$MAPE_i = 100 \times \frac{\sum_{j=1}^{n} \left| \frac{\hat{y}_j - y_j}{y_j} \right|}{n} \%$$

where $MAPE_i$ is the mean absolute percentage error of the ith prediction combiner 520, $\hat{y}_J$ is the predicted value of the performance variable for the jth sample in the evaluation period, and $y_j$ is the actual value of the performance variable for the jth sample in the evaluation period. The MAPE value for a given prediction combiner 520 indicates the average error of the prediction combiner 520 over the duration of the evaluation period. For example, a value of $MAPE_i=5\%$ indicates that the predicted values $\hat{y}_1 \ldots \hat{y}_n$ generated by the ith prediction combiner 520 had an average prediction error of 5% relative to the actual values of the performance variable $\hat{y}_1 \ldots \hat{y}_n$ over the duration of the evaluation period.

In some embodiments, step 908 includes generating a score for each of prediction combiners 520 based on a result of the evaluation. For example, step 908 can include assigning a score to each of prediction combiners 520 based on the MAPE values for each prediction combiner 520. In some embodiments, the score is an accuracy score. Step 908 assign higher accuracy scores to prediction combiners 520 with smaller MAPE values, and lower accuracy scores to prediction combiners 520 with larger MAPE values. The accuracy scores may indicate which of prediction combiners 520 produced the most accurate predictions, on average, over the duration of the evaluation period.

Still referring to FIG. 9, process 900 is shown to include selecting one of the prediction combiners based on the calculated scores (step 910). In some embodiments, step 910 is performed by combiner selector 530. Step 910 can include receiving the generated in step 908. The scores can be MAPE scores, accuracy scores, or any other scores which indicate the prediction accuracy of prediction combiners 520. In some embodiments, step 910 includes selecting one or more of prediction combiners 520 based on the assigned scores. For example, step 910 can include selecting the prediction combiner 520 with the lowest MAPE score or the highest accuracy score. In some embodiments, process 900 uses the selected prediction combiner 520 to generate the combined model prediction. For example, step 910 can include activating or enabling the selected prediction combiner 520 and deactivating or disabling the non-selected prediction combiners 520.

In some embodiments, process 900 includes periodically reactivating all of the inactive prediction combiners 520 and reevaluates their performance to determine whether a different prediction combiner 520 has become more accurate. For example, some of prediction combiners 520 may be more accurate under some operating conditions (e.g., high load conditions) and less accurate under other operating conditions (e.g., low load conditions). Process 900 can include reevaluating the performance of each prediction combiner 520 at regular intervals or in response to an event (e.g., the HVAC equipment transitioning into a different operating mode or state) to determine whether a different prediction combiner 520 would be more accurate than the previously-selected prediction combiner 520.

Process 900 is shown to include sliding the data window forward by a predetermined duration (step 912). For example, the data window can be shifted forward in time by a predetermined amount (e.g., one day) to define a new set of training data. Step 912 is described in greater detail with reference to FIG. 7. After shifting the data window forward, process 900 can return to step 902. Process 900 can be repeated iteratively each time the data window is shifted.

Zone Temperature Control System

Figure 10:
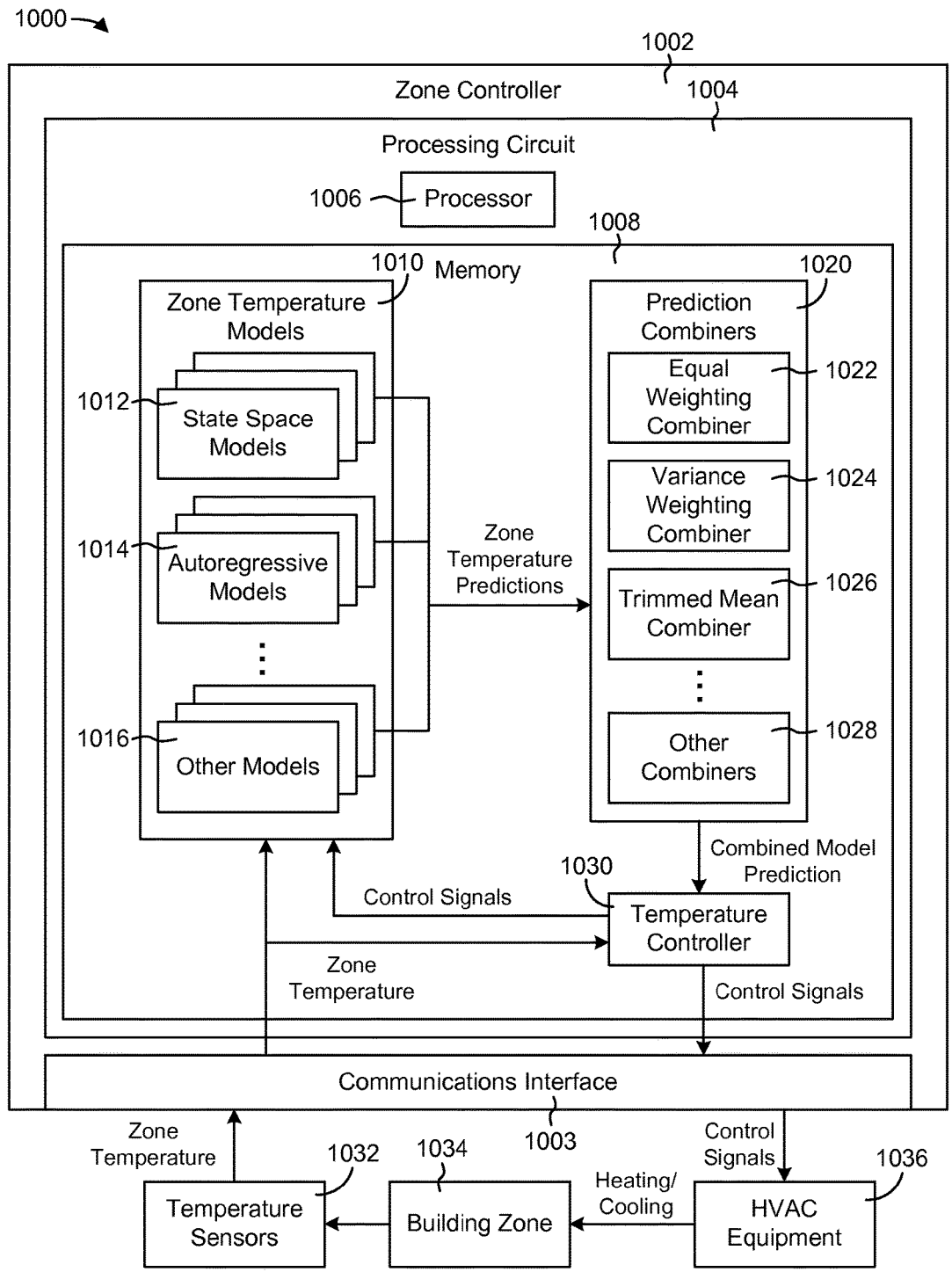
FIG. 10 is a block diagram of a temperature control system which can use components of the predictive modeling system of FIG. 4 to generate control signals for HVAC equipment and control the temperature of a building, according to an exemplary embodiment.

Referring now to FIG. 10, a block diagram of a temperature control system 1000 is shown, according to an exemplary embodiment. System 1000 is shown to include a zone controller 1002, temperature sensors 1032, a building zone 1034, and HVAC equipment 1036. Temperature sensors 1032 measure the temperature of building zone 1034 and provide zone temperature measurements to zone controller 1002. Zone controller 1002 can use zone temperature measurements to generate control signals (e.g., temperature setpoints, equipment operating points, etc.) for HVAC equipment 1036. Zone controller 1002 can provide the control signals to HVAC equipment 1036 which operate according to the control signals to provide heating and/or cooling to building zone 1034.

HVAC equipment 1036 can include any of a variety of HVAC equipment operable to control an environmental condition (e.g., temperature, humidity, etc.) in a building. For example, HVAC equipment 1036 can include heating devices 220, chillers 232, heat recovery heat exchangers 226, cooling towers 238, thermal energy storage devices 242-244, pumps, valves, other devices of subplants 202-212, or any other type of HVAC equipment or central plant equipment. Individual devices of equipment 1036 can be turned on or off to adjust the amount of heating or cooling provided to building zone 1034. In some embodiments, individual devices of HVAC equipment 1036 can be operated at variable capacities (e.g., operating a chiller at 10% capacity or 60% capacity) according to an operating setpoint received from zone controller 1002, thereby affecting the temperature of building zone 1034.

In some embodiments, zone controller 1002 uses a predictive modeling technique to predict the temperature of building zone 1034 at a future time. For example, zone controller 1002 can use a plurality of zone temperature models 1010 to predict the temperature of building zone 1034 and can use one or more prediction combiners 1020 to combine multiple zone temperature predictions to form a combined model prediction. Zone controller 1002 can use the combined model prediction to generate the control signals for HVAC equipment 1036. Several examples of predictive modeling techniques which can be used by zone controller 1002 are described in greater detail below.

Still referring to FIG. 10, zone controller 1002 is shown to include a communications interface 1003 and a processing circuit 1004. Communications interface 1003 may include wired or wireless interfaces (e.g., jacks, antennas, transmitters, receivers, transceivers, wire terminals, etc.) for conducting data communications with various systems, devices, or networks. For example, communications interface 1003 may include an Ethernet card and port for sending and receiving data via an Ethernet-based communications network and/or a WiFi transceiver for communicating via a wireless communications network. Communications interface 1003 may be configured to communicate via local area networks or wide area networks (e.g., the Internet, a building WAN, etc.) and may use a variety of communications protocols (e.g., BACnet, IP, LON, etc.).

Communications interface 1003 may be a network interface configured to facilitate electronic data communications between zone controller 1002 and various external systems or devices (e.g., temperature sensors 1032, HVAC equipment 1036, etc.). For example, zone controller 1002 may receive zone temperature measurements from temperature sensors 1032 via communications interface 1003. In various embodiments, zone controller 1002 can communicate directly with zone temperature sensors 1032 or can receive temperature measurements via an intermediate controller or building automation system (e.g., BAS 308). Zone controller 1002 can use the zone temperature measurements to generate control signals, which can be provided to HVAC equipment 1036 via communications interface 1003.

Processing circuit 1004 is shown to include a processor 1006 and memory 1008. Processor 1006 may be a general purpose or specific purpose processor, an application specific integrated circuit (ASIC), one or more field programmable gate arrays (FPGAs), a group of processing components, or other suitable processing components. Processor 1006 may be configured to execute computer code or instructions stored in memory 1008 or received from other computer readable media (e.g., CDROM, network storage, a remote server, etc.).

Memory 1008 may include one or more devices (e.g., memory units, memory devices, storage devices, etc.) for storing data and/or computer code for completing and/or facilitating the various processes described in the present disclosure. Memory 1008 may include random access memory (RAM), read-only memory (ROM), hard drive storage, temporary storage, non-volatile memory, flash memory, optical memory, or any other suitable memory for storing software objects and/or computer instructions. Memory 1008 may include database components, object code components, script components, or any other type of information structure for supporting the various activities and information structures described in the present disclosure. Memory 1008 may be communicably connected to processor 1006 via processing circuit 1004 and may include computer code for executing (e.g., by processor 1006) one or more processes described herein.

Still referring to FIG. 10, zone controller 1006 is shown to include several zone temperature models 1010. Zone temperature models 1010 can include any of a variety of predictive models configured to predict the temperature of building zone 1034. In some embodiments, zone temperature models 1010 predict the temperature of building zone 1034 at one or more future times as a function of the current (e.g., measured) zone temperature and/or the control signals generated by temperature controller 1030. Each of zone temperature models 1010 can be configured to predict the temperature of building zone 1034 using a different predictive modeling technique. For example, zone temperature models 1010 are shown to include state space models 1012, autoregressive models 1014, and other models 1016.

State space models 1012 can use a state space model resistor capacitor (RC) network to model the temperature of building zone 1034. In some embodiments, the state space model takes the form of:

$$\dot{x} = Ax + Bu$$

$$y = Cx + Du$$

where x is the state vector (e.g., building mass temperatures, air temperatures, etc.), y is the output vector (e.g., zone temperature), u is the input vector (e.g., temperature setpoints, control signals), A is the state (or system) matrix, B is the input matrix, C is the output matrix, and D is the feed through (or feed forward) matrix. Zone controller 1002 can perform a system identification process to identify values for matrices A, B, C, and D. An example of a system identification process which can be used by zone controller 1002 is described in detail in U.S. Pat. No. 9,235,657 titled "System Identification and Model Development" issued Jan. 12, 2016. The entire disclosure of U.S. Pat. No. 9,235,657 is incorporated by reference herein.

Autoregressive models 1014 can use an autoregressive (AR) model to predict the temperature of building zone 1034. In some embodiments, the AR model takes the form of:

$$y_t = c + ay_{t-1} + \varepsilon_t$$

where $y_t$ is the temperature of building zone 1034 at time t, $y_{t-1}$ is the temperature of building zone 1034 at time t−1, and $\varepsilon_t$ is process noise. In some embodiments, the AR model includes a moving average term to provide an autoregressive moving average (ARMA) model of the building zone temperature. An example of an AR model which can be used by zone controller 1002 is described in detail in U.S. patent application Ser. No. 14/717,593 titled "Building Management System for Forecasting Time Series Values of Building Variables" filed May 20, 2015. The entire disclosure of U.S. patent application Ser. No. 14/717,593 is incorporated by reference herein.

Each of zone temperature models 1010 can be configured to predict the temperature of building zone 1034 using a different predictive modeling technique. Zone temperature models 1010 can provide the zone temperature predictions to prediction combiners 1020. Prediction combiners 1020 can be configured to combine the zone temperature predictions into a single combined model prediction (e.g., a combined predicted temperature of building zone 1034). In some embodiments, prediction combiners 1020 include multiple different prediction combiners, each of which is configured to combine the zone temperature predictions using a different combining technique. For example, prediction combiners 1020 are shown to include equal weighting combiner 1022, variance weighting combiner 1024, trimmed mean combiner 1026, and other combiners 1028.

Equal weighting combiner 1022 can combine multiple zone temperature predictions by calculating an equal-weight average of the multiple zone temperature predictions. In some embodiments, equal weighting combiner 1022 is the same or similar to equal weighting combiner 522, as described with reference to FIG. 5. Variance weighting combiner 1024 can combine multiple zone temperature predictions using a variance weighting technique. In some embodiments, variance weighting combiner 1024 is the same or similar to variance weighting combiner 524, as described with reference to FIG. 5. Trimmed mean combiner 1026 can combine multiple zone temperature predictions using a trimmed mean combination technique. In some embodiments, trimmed mean combiner 1026 is the same or similar to trimmed mean combiner 526, as described with reference to FIG. 5.

Still referring to FIG. 10, zone controller 1002 is shown to include a temperature controller 1030. Temperature controller 1030 can be configured to generate control signals for HVAC equipment 1036 based on the combined model prediction and/or the measured temperature of building zone 1034. In some embodiments, the control signals for HVAC equipment 1036 are zone temperature setpoints. Temperature controller 1030 can use a model predictive control (MPC) technique to generate the zone temperature setpoints for each time step during an optimization period. In some embodiments, temperature controller 1030 performs an optimization process to generate zone temperature setpoints which minimize power consumption and/or energy cost over the optimization period.

In some embodiments, temperature controller 1030 performs the setpoint optimization subject to constraints on the temperature of building zone 1034, equipment capacities, and/or other optimization constraints. Temperature controller 1030 can use the combined model prediction from prediction combiners 1020 to determine the temperature of building zone 1034 predicted to result from a given set of temperature setpoints. Temperature controller 1030 can generate the zone temperature setpoints such that the combined model prediction (e.g., the predicted temperature of building zone 1034) is maintained within a predetermined temperature range.

Temperature controller 1030 can provide the control signals to HVAC equipment 1036. HVAC equipment 1036 operate according to the control signals to adjust an amount of heating or cooling provided to building zone 1034. For example, HVAC equipment 1036 can include heaters, chillers, fans, or other types of HVAC equipment configured to provide heating or cooling to building zone 1034. By operating HVAC equipment 1036, zone controller 1002 can affect the temperature or other environmental conditions of building zone 1034. Temperature controller 1036 can also provide the control signals to zone temperature models 1010. In some embodiments, zone temperature models 1010 use the control signals in combination with the current (e.g., measured) zone temperature to generate the zone temperature predictions.

Predictive modeling system 402 and temperature control system 1000 are examples of systems which use the model combining techniques described herein to generate a combined model prediction. However, it should be understood that the model combining techniques are not limited to predictive models. The model combining techniques can also be used to combine the outputs of non-predictive models to form a combined model output. For example, various types of non-predictive modeling systems can use the model combining techniques to generate a combined estimate for a variable of interest. One example of such a non-predictive modeling system is load estimation system 1100, described in detail below.

Load Estimation System

Figure 11:
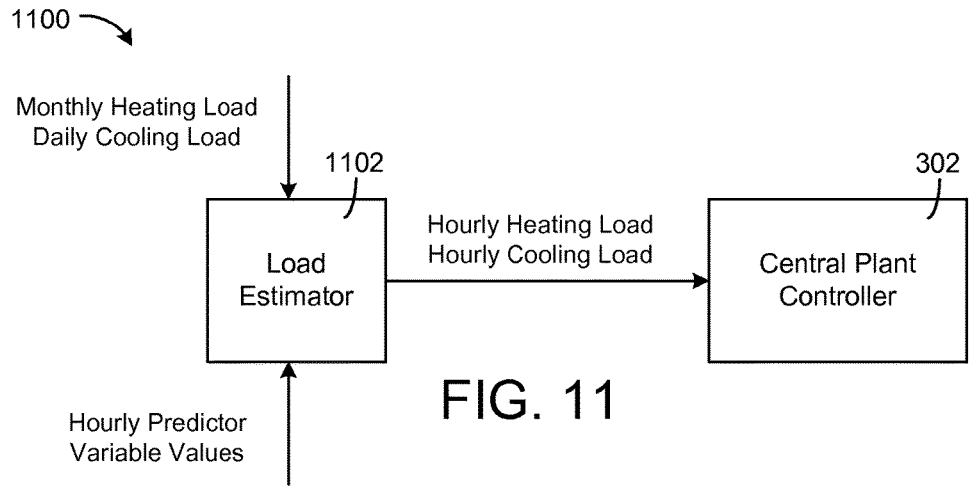
FIG. 11 is a block diagram illustrating the flow of information between a load estimator and a central plant controller which may be used to control the central plant of FIG. 2, according to an exemplary embodiment.
Figure 12:
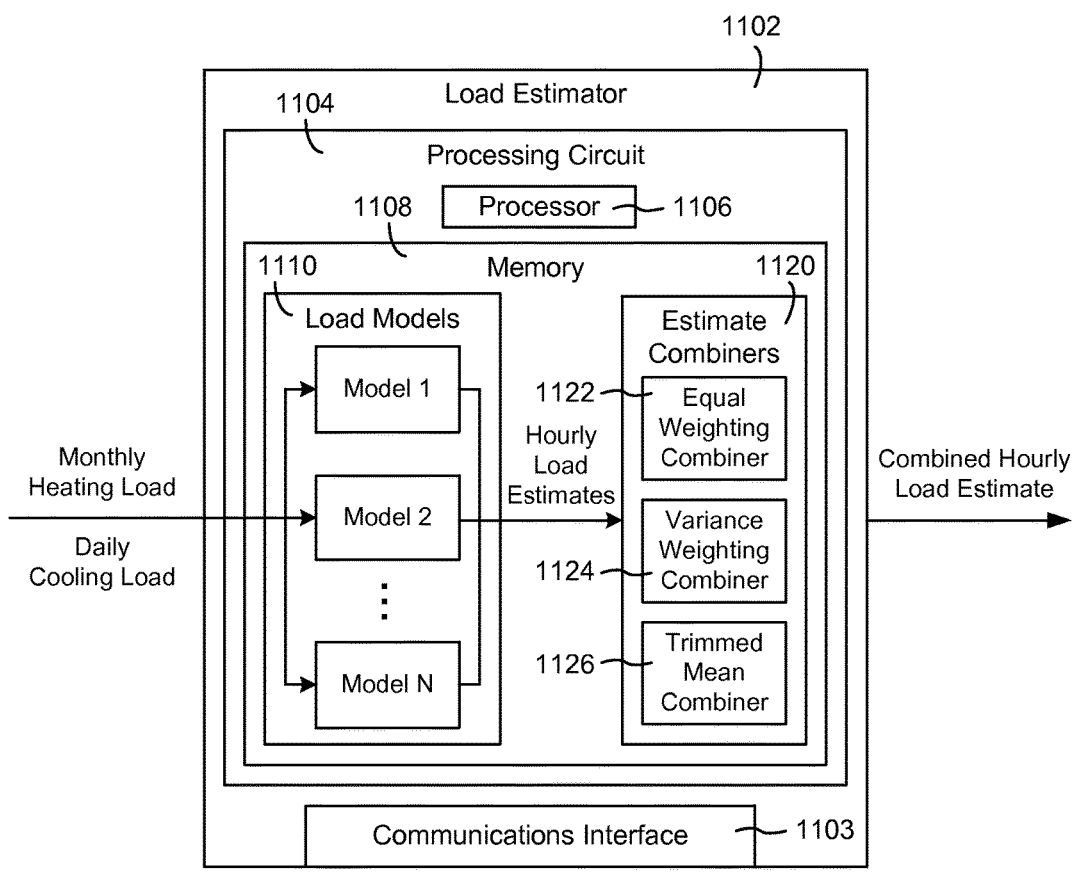
FIG. 12 is a block diagram illustrating the load estimator of FIG. 11 in greater detail, according to an exemplary embodiment.

Referring now to FIGS. 11-12, load estimation system 1100 is shown, according to an exemplary embodiment. Load estimation system 1100 is an example of a non-predictive modeling system which can use the model combining techniques described herein to generate a combined estimate for a variable of interest (e.g., a combined load estimate). System 1100 is shown to include central plant controller 302 and a load estimator 1102. Central plant controller 302 can be configured to monitor and control central plant 200, as described with reference to FIG. 3. In some embodiments, central plant controller 302 requires hourly heating and cooling loads as inputs. However, the heating and cooling load data may only be available in longer intervals (e.g., monthly heating loads and daily cooling loads). In the event that heating and cooling load data are not available in hourly intervals, load estimator 1102 can disaggregate the load data for longer intervals to generate the required inputs for central plant controller 302.

Load estimator 1102 may receive inputs of cumulative building energy loads over a first time period (e.g., monthly heating loads and daily cooling loads). Load estimator 1102 may increase the resolution of the cumulative building energy loads to generate load values for each of a plurality of second time periods shorter than the first time period. For example, load estimator 1102 may transform the monthly heating loads and daily cooling loads into hourly heating and cooling loads and may provide the hourly load values to central plant controller 302. Central plant controller 302 may control operations of central plant 200 using the hourly heating and cooling loads.

Load estimator 1102 is shown to receive inputs of monthly heating and daily cooling loads, according to an exemplary embodiment. The time period over which each of the loads may be sampled is not limited to those shown or specifically enumerated, and may be any amount of time. For example, the time period may be a month for cooling loads and a day for heating loads. In some embodiments, the time periods are measured in minutes or seconds. In some embodiments, load estimator 1102 receives only heating loads or only cooling loads. In other embodiments load estimator 1102 receives both heating and cooling loads. In some embodiments, the building energy loads are sampled by load estimator 1102 directly from plant equipment. In other embodiments, the building energy loads are input to load estimator 1102 from utility providers or an outside source, such as a third-party utility management system.

Load estimator 1102 may receive inputs of hourly predictor variable values, according to an exemplary embodiment. Predictor variables may be directly correlated to the load on central plant 200. Properly selected predictor variables are important to accurately estimate building energy loads. Although hourly values for the predictor variables are shown in FIG. 11, it should be understood that the time period over or interval at which each of the predictor variables is sampled is not limited to those shown or specifically enumerated, and may be any length of time. For example, the sampling interval could be five minutes, three hours, or any other duration. The resolution at which each of the predictor variables is sampled may be the same as the resolution of the load values estimated by load estimator 1102. For example, if load estimator 1102 estimates hourly building energy loads, load estimator 1102 may receive hourly predictor variable values.

Using the sampled predictor variable values, load estimator 1102 may generate a model that estimates the building energy load in terms of (i.e., as a function of) the predictor variables. After the model is trained, load estimator 1102 may use the model to estimate building energy loads over a plurality of time periods. For example, load estimator 1102 may estimate hourly cooling loads over a day. The estimated building energy loads may be estimated for time periods within the time period of the received building energy load. For example, load estimator 1102 may receive a monthly heating load. Load estimator 1102 may estimate hourly heating loads over the same month for which the monthly heating load was received. The input load data may include a plurality of data points. In some embodiments, the number of input load data points is preferably equal to, or greater than, the number of predictor variables.

The estimated building energy loads may be transmitted to central plant controller 302. Central plant controller 302 may use the estimated building energy loads to make control decisions for central plant 200. For example, central plant controller 302 may control a distribution of energy loads in central plant 200 based on the estimated building energy loads, as described with reference to FIG. 3. In some embodiments, load estimator 1102 includes some or all of the features of the load estimator described in U.S. patent application Ser. No. 14/971,813 filed Dec. 16, 2015, the entire disclosure of which is incorporated by reference herein.

Referring now to FIG. 12, a block diagram illustrating load estimator 1102 in greater detail is shown, according to an exemplary embodiment. Load estimator 1102 may receive one or more cumulative building energy loads (e.g., heating or cooling loads) for a first time period. For example, load estimator 1102 is shown receiving a monthly heating load and a daily cooling load. The time period over which each of the loads may be sampled is not limited to those shown or specifically enumerated, and may be any amount of time. Load estimator 1102 may be configured to increase the resolution of the building energy loads and provide higher-resolution building energy loads to central plant controller 302. For example, load estimator 1102 may transform the monthly heating load into hourly heating load values for each hour in the first time period (e.g., each hour in the month for which the cumulative heating load is received). Similarly, load estimator 1102 may transform the daily cooling load into hourly cooling load values for each hour in the first time period (e.g., each hour in the day for which the cumulative cooling load is received). Load estimator 1102 may provide the hourly heating and cooling load values to central plant controller 302 for use in optimizing central plant operation.

Load estimator 1102 is shown to include a processing circuit 1104 and a communications interface 1103. Communications interface 1103 may include wired or wireless interfaces (e.g., jacks, antennas, transmitters, receivers, transceivers, wire terminals, etc.) for conducting data communications with various systems, devices, or networks. For example, communications interface 1103 may include an Ethernet card and port for sending and receiving data via an Ethernet-based communications network and/or a Wi-Fi transceiver for communicating via a wireless communications network. Communications interface 1103 may be configured to communicate via local area networks or wide area networks (e.g., the Internet, a building WAN, etc.) and may use a variety of communications protocols (e.g., BACnet, IP, LON, etc.).

Communications interface 1103 may be a network interface configured to facilitate electronic data communications between load estimator 1102 and various external systems or devices (e.g., central plant controller 302, BAS 308, central plant 200, etc.). For example, load estimator 1202 may receive information from central plant controller 302 indicating one or more measured states of the controlled building (e.g., temperature, humidity, electric loads, etc.) and one or more states of equipment 340 (e.g., equipment status, power consumption, equipment availability, etc.). Communications interface 1103 may receive inputs from BAS 308 and/or equipment 340 and may provide operating parameters (e.g., on/off decisions, setpoints, etc.) to equipment 340 via BAS 308. The operating parameters may cause BAS 308 to activate, deactivate, or adjust a setpoint for various devices of equipment 340.

Processing circuit 1104 is shown to include a processor 1106 and memory 1108. Processor 1106 may be a general purpose or specific purpose processor, an application specific integrated circuit (ASIC), one or more field programmable gate arrays (FPGAs), a group of processing components, or other suitable processing components. Processor 1106 may be configured to execute computer code or instructions stored in memory 1108 or received from other computer readable media (e.g., CDROM, network storage, a remote server, etc.).

Memory 1108 may include one or more devices (e.g., memory units, memory devices, storage devices, etc.) for storing data and/or computer code for completing and/or facilitating the various processes described in the present disclosure. Memory 1108 may include random access memory (RAM), read-only memory (ROM), hard drive storage, temporary storage, non-volatile memory, flash memory, optical memory, or any other suitable memory for storing software objects and/or computer instructions. Memory 1108 may include database components, object code components, script components, or any other type of information structure for supporting the various activities and information structures described in the present disclosure. Memory 1108 may be communicably connected to processor 1106 via processing circuit 1104 and may include computer code for executing (e.g., by processor 1106) one or more processes described herein.

Still referring to FIG. 12, load estimator 1102 is shown to include several load models 1110. Load models 1110 can include any of a variety of models configured to estimate hourly heating or cooling loads. In some embodiments, load models 1110 estimate the heating and cooling loads at hourly intervals as a function of the monthly heating load, the daily cooling load, and/or the hourly predictor variable values. Each of load models 1110 can be configured to estimate the heating and cooling loads using a different modeling technique. For example, load models 1110 are shown to include model 1, model 2, . . . , model N, where N is the total number of load models 1110. Each of the N load models 1110 can have a different model form, or otherwise implement a different modeling technique to estimate the heating and cooling loads.

Each of load models 1110 can generate a set of hourly load estimates. Each set of hourly load estimates can include multiple hourly load estimates (e.g., a load estimate for each hour). Load models 1110 can provide the hourly load estimates to estimate combiners 1120. Estimate combiners 1120 can be configured to combine the hourly load estimates into a single combined set of hourly load estimates (e.g., a combined load estimate for each hour). In some embodiments, estimate combiners 1120 include multiple different estimate combiners, each of which is configured to combine the hourly load estimates using a different combining technique. For example, estimate combiners 1120 are shown to include equal weighting combiner 1122, variance weighting combiner 1124, and trimmed mean combiner 1126.

Equal weighting combiner 1122 can combine multiple sets of hourly load estimates by calculating an equal-weight average of the hourly load estimates for each hour. In some embodiments, equal weighting combiner 1122 is the same or similar to equal weighting combiner 522, as described with reference to FIG. 5. Variance weighting combiner 1124 can combine multiple sets of hourly load estimates using a variance weighting technique. In some embodiments, variance weighting combiner 1124 is the same or similar to variance weighting combiner 524, as described with reference to FIG. 5. Trimmed mean combiner 1126 can combine multiple sets of hourly load estimates using a trimmed mean combination technique. In some embodiments, trimmed mean combiner 1126 is the same or similar to trimmed mean combiner 526, as described with reference to FIG. 5. The combined hourly load estimates can be provided to central plant controller 302 and used to optimize the performance of central plant 200.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A heating, ventilation, or air conditioning (HVAC) system for a building, the HVAC system comprising:
   HVAC equipment operable to affect an environmental condition in the building, a performance of the HVAC equipment characterized by a performance variable;
   a controller configured to determine an operating point for the HVAC equipment and to operate the HVAC equipment at the operating point; and
   a predictive modeling system comprising:
      a first HVAC component model configured to generate a first component model prediction comprising a first predicted value of the performance variable for a particular future time;
      a second HVAC component model configured to generate a second component model prediction comprising a second predicted value of the performance variable for the particular future time; and
      one or more prediction combiners configured to combine the first and second component model predictions to form a combined model prediction, wherein the combined model prediction comprises another predicted value of the performance variable at the particular future time;
      wherein the controller is configured to use the combined model prediction to optimize the operating point and to operate the HVAC equipment at the optimized operating point; and
   one or more sensors configured to measure one or more measured variables associated with the HVAC equipment;
   wherein the first and second HVAC component models are configured to generate the component model predictions as functions of the measured variables.

2. The HVAC system of claim 1, wherein the operating point is a setpoint for the HVAC equipment and the performance variable indicates a predicted power consumption of the HVAC equipment at the setpoint.

3. The HVAC system of claim 1, wherein the first and second HVAC component models have different functional forms and use different mathematical relationships to generate the first and second component model predictions.

4. The HVAC system of claim 1, wherein the prediction combiners comprise an equal weighting combiner configured to generate the combined model prediction by calculating an average of the component model predictions.

5. The HVAC system of claim 1, wherein the prediction combiners comprise a variance weighting combiner configured to:
   identify a variance associated with each of the component model predictions;
   assign a weight to each of the component model predictions based on the variance associated therewith; and
   generate the combined model prediction by calculating a weighted average of the component model predictions using the assigned weights.

6. The HVAC system of claim 1, wherein the prediction combiners comprise a trimmed mean combiner configured to:
   create an initial set of the component model predictions;
   identify one or more highest values of the component model predictions and one or more lowest values of the component model predictions;
   create a filtered subset of the component model predictions by removing the identified component model predictions from the initial set; and
   generate the combined model prediction by calculating an average of the component model predictions in the filtered subset.

7. The HVAC system of claim 6, wherein the trimmed mean combiner is configured to use a variance weighting technique to calculate the average of the component model predictions in the filtered subset, the variance weighting technique comprising:
   identifying a variance associated with each of the component model predictions in the filtered subset;
   assigning a weight to each of the component model predictions based on the variance associated therewith; and
   generating the combined model prediction by calculating a weighted average of the component model predictions in the filtered subset using the assigned weights.

8. The HVAC system of claim 1, further comprising:
   a model evaluator configured to calculate a score for each of the prediction combiners by comparing the combined model predictions generated by each of the prediction combiners to actual values of the performance variable; and
   a combiner selector configured use the calculated scores to select one of the prediction combiners;
   wherein the predictive modeling system is configured to use the selected prediction combiner to generate the combined model prediction.

* * * * *